(12) United States Patent
Jiang et al.

(10) Patent No.: US 11,436,437 B2
(45) Date of Patent: Sep. 6, 2022

(54) THREE-DIMENSION (3D) ASSISTED PERSONALIZED HOME OBJECT DETECTION

(71) Applicant: Huawei Technologies Co., Ltd., Shenzhen (CN)

(72) Inventors: Wei Jiang, Santa Clara, CA (US); Wei Wang, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/126,269

(22) Filed: Dec. 18, 2020

(65) Prior Publication Data

US 2021/0103776 A1    Apr. 8, 2021

Related U.S. Application Data

(63) Continuation of application No. PCT/CN2019/091748, filed on Jun. 18, 2019.
(Continued)

(51) Int. Cl.
*G06K 9/62* (2022.01)
*G06V 10/22* (2022.01)
(Continued)

(52) U.S. Cl.
CPC ......... *G06K 9/6257* (2013.01); *G06K 9/6232* (2013.01); *G06K 9/6265* (2013.01);
(Continued)

(58) Field of Classification Search
None
See application file for complete search history.

(56) References Cited

U.S. PATENT DOCUMENTS 10,235,771 B2\* 3/2019 Rad ..................... G06V 20/647
2019/0026958 A1\* 1/2019 Gausebeck .......... H04N 13/246
(Continued)

FOREIGN PATENT DOCUMENTS

CN     105427385 A    3/2016
CN     107680158 A    2/2018
(Continued)

OTHER PUBLICATIONS

T. Lin, and et al., "Microsoft COCO: common objects in context," ECCV 2014, Part V. LNCS 8693, 2014, pp. 740-755, Switzerland.
(Continued)

*Primary Examiner* — Mohammed Rachedine
(74) *Attorney, Agent, or Firm* — Vierra Magen Marcus LLP

(57) ABSTRACT

The disclosure relates to technology for object detection in which a vision system receives training datasets including a set of two-dimensional (2D) images of the object from multiple views. A set of 3D models is reconstructed from the set of 2D images based on salient points of the object selected during reconstruction to generate one or more salient 3D models of the object that is an aggregation of the salient points of the object in the set of 3D models. A set of training 2D-3D correspondence data are generated between the set of 2D images in a first training dataset of the training datasets and the salient 3D model of the object generated using the first training dataset. A deep neural network is trained using the set of training 2D-3D correspondence data generated using the first training dataset for object detection and segmentation.

27 Claims, 11 Drawing Sheets

Related U.S. Application Data

(60) Provisional application No. 62/799,230, filed on Jan. 31, 2019.

(51) Int. Cl.

| | | |
|---|---|---|
| *G06V 10/46* | (2022.01) | |
| *G06V 20/64* | (2022.01) | |
| *G06V 10/82* | (2022.01) | |
| *G06V 10/44* | (2022.01) | |
| *G06T 7/11* | (2017.01) | |
| *G06T 19/20* | (2011.01) | |

(52) U.S. Cl.
CPC ........... *G06K 9/6292* (2013.01); *G06V 10/22* (2022.01); *G06V 10/464* (2022.01); *G06V 20/647* (2022.01)

(56) References Cited

U.S. PATENT DOCUMENTS

| | | | | |
|---|---|---|---|---|
| 2019/0217476 | A1* | 7/2019 | Jiang | B25J 9/1697 |
| 2020/0160613 | A1* | 5/2020 | Han | G06V 40/103 |
| 2020/0226407 | A1* | 7/2020 | Kendrick | G06V 20/653 |
| 2021/0201565 | A1* | 7/2021 | Dibra | G06T 7/0012 |

FOREIGN PATENT DOCUMENTS

| | | | | |
|---|---|---|---|---|
| CN | 108053469 | A | | 5/2018 |
| CN | 108537191 | A | | 9/2018 |
| CN | 109567837 | A * | 4/2019 | ............ A61B 6/025 |
| WO | 2017029488 | A2 | 2/2017 | |
| WO | WO-2019073267 | A1 * | 4/2019 | |
| WO | WO-2020069049 | A1 * | 4/2020 | ........... G06N 3/0454 |
| WO | WO-2020099338 | A1 * | 5/2020 | ......... G06K 9/00201 |

OTHER PUBLICATIONS

J. Redmon et al., "YOLO9000: Better, Faster, Stronger", Proceedings of the IEEE Conference on Computer Vision and Pattern Recognition (CVPR), pp. 7263-7271, 2017.

S. Ren, et al., "Faster r-cnn: Towards read-time object detection with region proposal networks", NIPS, pp. 1-14, 2015.

Seitz and et al., "A comparison and evaluation of multi-view stereo reconstruction algorithms," IEEE CVPR, pp. 1-8, 2006.

J. Yang et al., "Go-ICP: A Globally Optimal Solution to 3D ICP Point-Set Registration," IEEE Transactions on Pattern Analysis and Machine Intelligence, 38(11): 2241-2254, 2016.

Lourakis and Argyros, "SBA: A Software Package for Generic Sparse Bundle Adjustment", ACM Trans. Math. Software, vol. 36, No. 1, Article 2, pp. 2:1-2:30, 2009.

R. Guler et al.,"DensePose: Dense human pose estimation in the wild," CVPR, pp. 7297-7306, 2018.

K. He, et al., "Deep residule learning for image recognition", CVPR 2016 , pp. 770-778.

International Search Report and Written Opinion dated Oct. 28, 2019, International Application No. PCT/CN2019/091748.

* cited by examiner

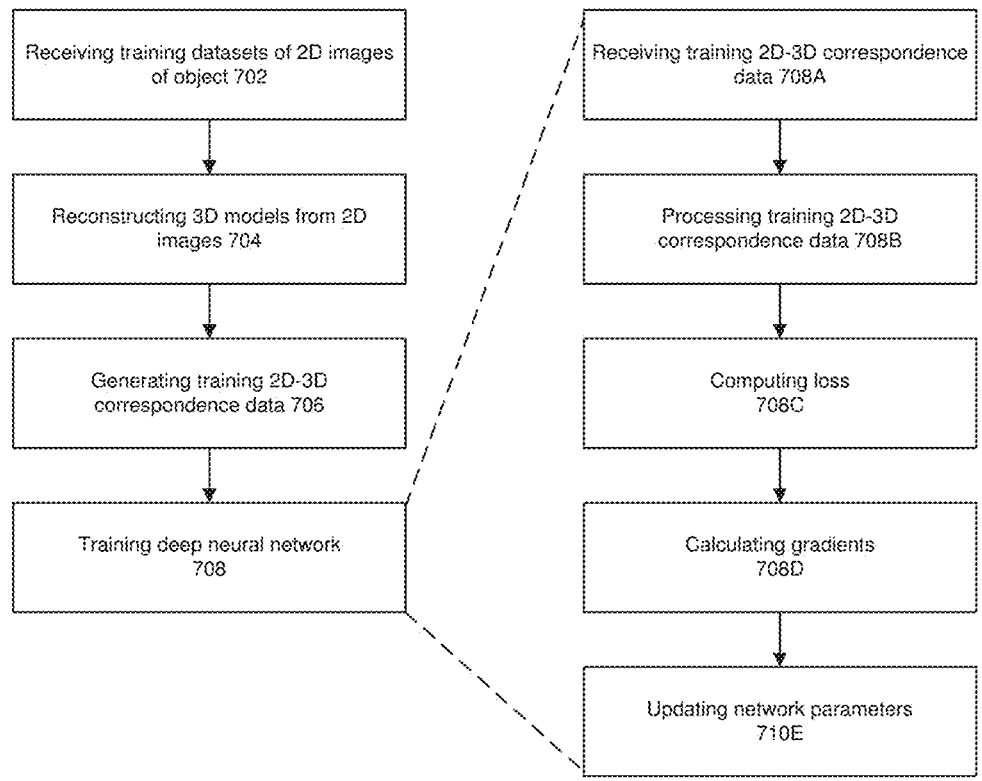
FIG. 7A
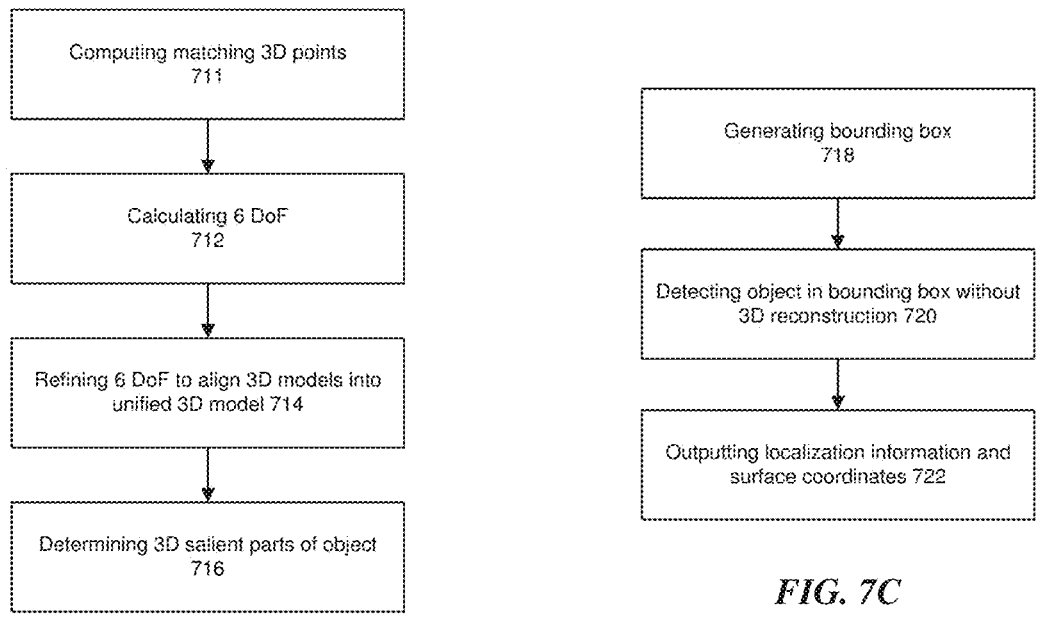
FIG. 7B
FIG. 7C

THREE-DIMENSION (3D) ASSISTED PERSONALIZED HOME OBJECT DETECTION

CLAIM FOR PRIORITY

This application is a Continuation of and claims the benefit of priority to PCT/CN2019/091748, filed Jun. 18, 2019, which claims the benefit of priority to U.S. Provisional Appl. No. 62/799,230, filed Jan. 31, 2019, the entire contents of which are hereby incorporated by reference.

FIELD

The disclosure generally relates to object detection, and in particular, to object segmentation and pose estimation.

BACKGROUND

Object detection in computer vision allows computing systems to understand an image or a set of images by locating objects from the image(s). The ability of a computing system to accurately detect and localize objects in images has numerous applications, such as content-based searching, targeted advertisements, driving and medical diagnoses. It is a challenge, however, in object recognition methods and systems, to teach the computing system to detect and localize particular objects and parts of objects falling into the same class or category, but which also fail to have consistent or recognizable features in a given image.

Computer vision techniques achieve great success in fully supervised object recognition in which label images are used to train a recognition system. However, fully supervised object recognition demands a large amount of labeled training data, which is costly to obtain and not always available because most labeled training data is created by manual human labeling of images. To avoid the need for extensive human involvement, many unsupervised approaches have been proposed for training object recognition systems. While important progress has been made, these unsupervised approaches require certain conditions, e.g., large occupation of foreground objects, exclusion of irrelevant other object types and clean backgrounds. These conditions limit application of unsupervised object recognition.

BRIEF SUMMARY

According to one aspect of the present disclosure, there is provided a computer-implemented method for object detection, including receiving one or more training datasets including a set of two-dimensional (2D) images of the object from multiple views, wherein the set of 2D images are captured in different settings for each of the one or more training datasets; reconstructing a set of 3D models from the set of 2D images in each of the one or more training datasets based on salient points of the object selected during reconstruction to generate one or more salient 3D models of the object that is an aggregation of the salient points of the object in the set of 3D models; generating a set of training 2D-3D correspondence data between the set of 2D images of the object in a first training dataset of the one or more training datasets and the salient 3D model of the object generated using the first training dataset; and training a deep neural network using the set of training 2D-3D correspondence data generated using the first training dataset for object detection and segmentation.

Optionally, in any of the preceding aspects, the computer-implemented method further including computing a set of matching 3D points for each set of matching 3D models in the set of 3D models; calculating a six degree of freedom (6 DoF) rotation and translation to transform the set of matching 3D models; refining the overall 6 DoF rotations and translation to align each of the 3D models into a unified 3D world coordinate system and to generate a unified 3D model by aligning each of the 3D models in the set of 3D models; and determining a set of 3D salient parts of the object using the deep neural network to generate the salient 3D model of the object.

Optionally, in any of the preceding aspects, the 3D model is a 3D point cloud of the object and each point in the 3D point cloud records a 3D coordinate of the point in a 3D space; and the computer-implemented method further including computing a feature representation from each point in the 3D point cloud as a feature vector computed based on the visual appearance of the corresponding pixels in the corresponding 2D images.

Optionally, in any of the preceding aspects, the computer-implemented method further including pruning the first set of training 2D-3D correspondence data to reduce noise in the first set of 2D images.

Optionally, in any of the preceding aspects, wherein training the deep neural network includes receiving the set of training 2D-3D correspondence data; processing the set of training 2D-3D correspondence data using the deep neural network to generate 2D points of the 2D-3D correspondence data; computing a loss between the 2D points and ground-truth 2D points using the loss function; calculating gradients based on the computed loss; and updating network parameters based on the computed loss and calculated gradients.

Optionally, in any of the preceding aspects, the computer-implemented method further including receiving one or more new 2D images at an object detection network, the object detection network generating an object bounding box as input into the trained deep neural network.

Optionally, in any of the preceding aspects, the computer-implemented method further including detecting the object identified in the object bounding box using the trained deep neural network without performing 3D reconstruction of the one or more new 2D images; and outputting localization information and surface coordinates of the object detected by the trained deep neural network.

Optionally, in any of the preceding aspects, wherein the trained deep neural network processes the object bounding box by convolving the one or more new 2D images to extract features, the extracted features forming a feature map; creating regions of interest (RoIs) by applying a region proposal method to the feature map; feeding the RoIs and the feature map of the one or more 2D images to refine the RoIs by aligning boundaries of the feature map and target feature map; and outputting the localization information and classification results of the object based on the refined RoIs, where that the localization information defines a location of the object in the image and the classification results estimate the surface coordinates of the object.

Optionally, in any of the preceding aspects, the computer-implemented method further including generating the set of training 2D-3D correspondence data between the set of 2D images of the object in a second training dataset of the one or more training datasets and the salient 3D model of the object generated using the second training dataset; and training the deep neural network using the set of training 2D-3D correspondence data generated using the second training dataset for object detection and segmentation.

According to still one other aspect of the present disclosure, there is a device for object detection, including a non-transitory memory storage comprising instructions; and one or more processors in communication with the memory, wherein the one or more processors execute the instructions to receive one or more training datasets including a set of two-dimensional (2D) images of the object from multiple views, wherein the set of 2D images are captured in different settings for each of the one or more training datasets; reconstruct a set of 3D models from the set of 2D images in each of the one or more training datasets based on salient points of the object selected during reconstruction to generate one or more salient 3D models of the object that is an aggregation of the salient points of the object in the set of 3D models; generate a set of training 2D-3D correspondence data between the set of 2D images of the object in a first training dataset of the one or more training datasets and the salient 3D model of the object generated using the first training dataset; and train a deep neural network using the set of training 2D-3D correspondence data generated using the first training dataset for object detection and segmentation.

According to still one other aspect of the present disclosure, there is a non-transitory computer-readable medium storing computer instructions for object detection, that when executed by one or more processors, cause the one or more processors to perform the steps of receiving one or more training datasets including a set of two-dimensional (2D) images of the object from multiple views, wherein the set of 2D images are captured in different settings for each of the one or more training datasets; reconstructing a set of 3D models from the set of 2D images in each of the one or more training datasets based on salient points of the object selected during reconstruction to generate one or more salient 3D models of the object that is an aggregation of the salient points of the object in the set of 3D models; generating a set of training 2D-3D correspondence data between the set of 2D images of the object in a first training dataset of the one or more training datasets and the salient 3D model of the object generated using the first training dataset; and training a deep neural network using the set of training 2D-3D correspondence data generated using the first training dataset for object detection and segmentation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIGS. 7A-7C are example flow diagrams of object detection in accordance with embodiments of the disclosure.

DETAILED DESCRIPTION

Figure 1:
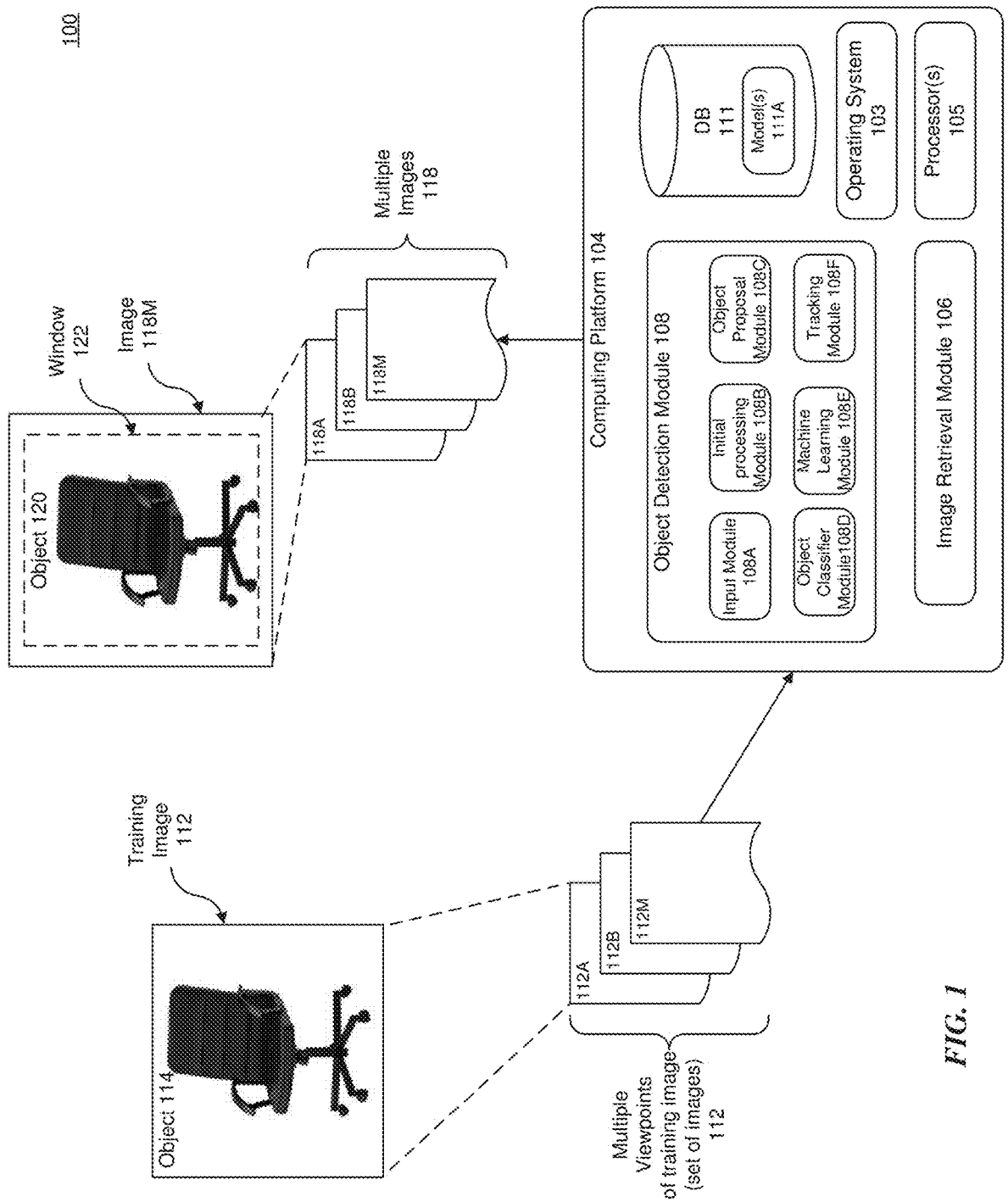
FIG. 1 illustrates an example computing system to train and recognize objects.

The present disclosure will now be described with reference to the figures, which in general relate to object detection using trained deep neural networks.

Machine learning applies computer vision techniques to analyze and understand images. Such techniques can be used to recognize objects in a wide variety of settings. Prior to being able to detect objects in images, computer vision systems are first trained to recognize the objects. However, applying current training techniques to analyze images captured in a private setting is a non-trivial task. Specifically, object detection in a private setting, such as a home, is often predicated upon images that are of lesser quality than those taken in public, such as at a ball game or museum. For example, images captured at home often come from robots or surveillance cameras with lower quality output, whereas images taken in public often come from cameras and phones with higher quality output for later display and sharing. Moreover, the types of objects being captured and detected in a private setting versus a public setting are also different. Public objects detection often focuses on diverse object categories, such as pedestrians, automobiles, buildings, animals, etc. Objects in private tend to be less diverse in terms of both category and variety within a category. For example, an object (such as a bottle) found in a public setting may have many diverse features, as numerous different types of bottle may be found. In a private setting, such as the home, objects (such as a bottle) tend to be far less diverse. For example, a far few types of bottles will be found in any one private setting and may even be personalized. Accordingly, instead of having to detect a bottle as a generic category (given the numerous variety of bottles in public), one may need to distinguish a limited number of different types of bottles that are often found in the particular private setting. Similar to the different variety of objects found in public versus private settings, the environmental settings themselves are also different. For example, the lighting and perspective of bottles in a public settings, such as images posted on the web, is typically less challenging than lighting and perspective of a bottle in a private setting (where access to the object under different conditions is not typically possible).

Another non-trivial task with images captured in a private setting is one of dense object segmentation and object pose estimation in 2D images. Object segmentation and object pose estimation is a key requirement for many applications, such as robust object tracking in a vision system, physically handling an object for a robot, etc. Traditionally, one can perform 3D reconstruction of the object to estimate object pose, which is generally very time consuming and prone to error. However, one advantage of a computer vision system deployed in a private setting is that it can examine a user defined object during an offline training process after deployment. This disclosure proposes takes advantage of such capability to train a dense object segmentation and pose estimation system, which at online test time, does not require complicated and error prone 3D reconstruction and directly conducts object segmentation and pose estimation in 2D images.

It is understood that the present embodiments of the disclosure may be implemented in many different forms and that claim scope should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Object detection is an important problem in a variety of engineering and scientific disciplines such as computer vision, artificial intelligence, and biometrics. For example, in the many industrial settings today, robots are used for parts assembly and manufacturing. These robots are equipped with one or more cameras, e.g., CCD or CMOS, which give them vision. The robot must recognize objects to perform various tasks, such as picking up the object to assemble a product. However, the object can be in any number of poses (position, orientation, rotation), under various lighting conditions, etc. Accordingly, the robot must be trained to recognize the object regardless of its pose and environment. As is known in the art, robots include software that attempts to identify the object from images taken by the one or more cameras. Statistical learning and classification may also be used for some of the object detection applications. It is also appreciated that while robots may be used as one form of object recognition, the application is not limited to such use.

In a real-world environment, the appearance of the object changes dramatically due to the change in view perspective, illumination, or deformation. As such, a single classifier cannot effectively detect objects whose appearance is subject to many changes. Classifier networks are general solutions based on the divide-and-conquer concept. The classifier networks must be trained to properly classify (detect, recognize) the particular object(s) of interest, such as a chair or desk in a home environment. Generally, the process starts with an untrained network. A training pattern (e.g. images of the object in various poses and lighting conditions) is presented to the network. The image signals are passed through the network to produce an output (for example, the result of classification, detection or measurement). The output results are evaluated and compared to optimal results and any differences are errors. This error can be a function of weights that are assigned to features of the object image, for example. Some features are better than others for recognizing the object and may be assigned a greater weight. The weights are iteratively adjusted to reduce the error and thus give greater confidence in the classification network. It is desirable to automatically train a classification network with minimum error, time, and effort.

In order to recognize an object in the images, the system should be initially trained on a representation of that object. Such representation involves modelling of the object and generation of a descriptor (or classifier) that could be applied to any image during runtime to find the target object. The images used for training and evaluation of the solution should represent possible appearances of the object in a real environment—if the classifier can recognize the target object in evaluation images, it should be able to successfully find it in any image during the runtime. However, capturing the representative images to ensure that the system will reliably perform in normal operation is a difficult challenge and in many instances it is not practical to obtain them. Therefore, it often takes multiple interactions with the system and/or users to address possible variations of environment such as noise, occlusions and lighting variations, and to create and tune the solution. In many cases, the classifier is modified or its parameters tuned based on failure cases during system setup or operation. Moreover, object detection algorithms employed in the system often require large amounts of data to adequately train the classifier network. Such data may include both true and false examples of the object in order to assist in training. It is also necessary for samples that include the object to be labelled with ground truth attributions (e.g. location, orientation, pose, etc.). These visual ground truth annotations to the data are usually input manually by an operator that is observing the object when its image is taken by a camera.

In general, the larger the amount of data, the better the algorithm may be trained, which in turn leads to better detection results. However, larger amounts of data require a long time to gather and are often not feasible to obtain manually. Complicating matters even further, objects without well-defined boundaries and features are more complex to detect than objects with well-defined boundaries and features, and therefore require more advanced training. For example, the human face and body have well-defined boundaries and features (e.g., nose, mouth, legs, etc.), whereas personalized or tailored objects (e.g., a coffee mug, chair, bicycle, etc.) may come in many different shapes and sizes without any recognizable features from one personalized object to the next. These and other factors all play an important role in the ability of a system to accurately recognize and detect personalized objects in an environment.

While the term "personalized" often denotes something (i.e., an object) tailored to a specific individual, within the context of this disclosure it is appreciated that a "personalized" object is not limited to such a definition. Personalized may refer to visual categories (or object in a visual category) that may be structurally diverse or vary, such as chairs or a bicycle, where it may be difficult to define one or more parts or landmarks that are consistent (e.g., the appearance is variable), namable or uniquely defined across all instances of the visual category (or object in the visual category). For example, a bicycle may be an object that falls into a specific visual category, but for which not all parts of the bicycle are consistent (e.g., the handlebars or seats of one bicycle may appear structurally diverse (in different positions or locations) than the handlebars or seats of another bicycle). This is opposed to, for example, the human body or face, in which body parts (e.g., nose, mouth, legs, etc.) are consistently located in the same position and are not structurally diverse.

FIG. 1 illustrates an example computing system to train and recognize objects. The computing system 100 includes, for example, training image 112 including object 114, multiple viewpoints 112A-112M of the training image 112 (in which images of the object are captured under different environmental settings and poses—e.g., during daylight, at a 45 degree angle, etc.), a computing platform 104, multiple images 118, window 122, and image 124 including object 120. The computing platform 104 includes, but is not limited to, an operating system (O/S) 103, processor(s) 105, image retrieval module 105 and an object detection module 108.

Operating system 103 is system software that supports a computing device's functions, such as scheduling tasks, executing applications and controlling peripherals. Any different number of operating systems, such as Windows™, macOS™ Linux™ (including comparable mobile versions, such as Android or iOS), may be installed as the system software.

The processor(s) 105 may include, without limitation, CPU-type processing unit, a GPU-type processing unit, a field-programmable gate array (FPGA), a digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. Where the data being processed by processor(s) 105 is a digital image, the processor(s) 105 can implement the methods and procedures described below on the digital image to extract features in the digital image and further analyze the image based on the extracted features.

The object detection module 108 can include one or more modules, illustrated as modules 108A-108F. However, it is appreciated that the object detection module 108 is not limited to this number of modules, and that the number of modules can be higher or lower. The functionality described below for each of the modules 108A-108F may be performed individually or may be combined or split using any number of modules to perform the functionality. For example, input module 108A can represent an input module with logic to program the processor(s) 105 to deliver the input (e.g., an image) back to the object detection module 108 for processing.

Initial processing module 108B includes, for example, logic to program processor(s) 105 to generate a convolutional feature map of the input. In various examples, the convolutional feature map can be a different version of the input image. For example, the convolutional feature map can be a CONV5 feature map. In one embodiment, the initial processing module 108B can include a Deep Convolutional Neural Network (CNN), shown in FIG. 6B and described below. The Deep CNN can process an input image through, but not limited to, multiple convolutional layers, pooling, normalization, non-linearity and/or fully-connected layers, some of which are optional. The input image can be iteratively processed through each layer of the Deep CNN, and output as a convolutional feature map. The Deep CNN can be a Zeiler and Fergus model, a Simonyan and Zisserman model, or any known CNN model.

Object proposal module 108C includes, for example, logic to program processing(s) 105 to propose one or more candidate object locations (e.g., region proposals) on the convolutional feature map. The proposals can be represented in different forms, including but not limited to, bounding boxes, masking, edge detection, or any other form of recognizing the location of candidate objects in an image. In one embodiment, the object proposal module 108C may include a Region Proposal Network (RPN), which may be a neural network. For example, the RPN may process the convolutional feature map and hypothesize candidate objects and corresponding locations thereof. Based on the hypothesis, the RPN can draw proposals in the form of a bounding box (or other shape) around each candidate object in the convolutional feature map.

A bounding box, mask or edge may generally refer to a segmentation of an image or portion of an image, where the bounding box, mask or edges generally define the boundary or portion of the boundary of the object in an image. This can be graphically depicted using an outline of the object or by displaying the object in one color (e.g., white) and the surrounding background in another color (e.g., black). A mask need not be graphically displayed. For example, a mask can be information that identifies the location of the boundary or portion of the boundary of the object.

Object classifier module 108D includes, for example, logic to program processor(s) 105 to evaluate the candidate objects proposed by the object proposal module 108C. For example, the object classifier module 108D can evaluate each proposal and determine a classification (e.g., a type, a class, a group, a category, etc.) of the candidate object in the proposal. In one embodiment, the classification of the object can be based on a pre-determined fixed number of object classes. For example, the object classifier module 108C can evaluate the object and determine that the object is one of any number of predetermined object classes. In various examples, the object classifier module can calculate a confidence score. In such examples, the confidence score may be based on the degree of certainty that the object is of the object category to which it is assigned. For example, the object classifier module may determine that a candidate object is a chair and assign a certainty level (e.g., 90% certain) to the classification of the object.

Object classification may also include landmark feature based training and extraction (not shown). In one embodiment, landmark points may be selected or identified by the user or operator of the computer platform 104. For example, the user may input the location of the landmark points in the set of training images 112A-112M or the user may select a predetermined pattern, map, or configuration of landmark points in the training images 112A-112M.

Machine learning module 108E may include, for example, logic to program processor(s) 105 for extraction of training images 112A-112M, corresponding object data for the training images 112A-112M (e.g., object category, location, number, etc.), and starting parameters (i.e., initial system parameters). In one embodiment, the training images 112A-112M, corresponding object data, and starting parameters may be stored in a database (DB) 111, such as an image database. In one embodiment, the training images 112A-112M, corresponding object data, and starting parameters can be extracted or received from a remote computing device and/or stored in DB 111. In one other embodiment, the DB 111 stores a training and/or trained model(s) 111A generated as a result of the machine learning. It is appreciated that the DB 111 may also be located remotely from computing platform 104 and communicatively connected, for example, by a network, such as the Internet.

In one embodiment, the machine learning module 108E can train the object detection module 108. For example, the machine learning module 108E can train the system using stochastic gradient descent and backpropagation. In one other example, the machine learning module 108E can initialize the initial processing module 108B, the object proposal module 108C and the object classifier module 108D with the starting parameters. After initialization, the machine learning module 108E can train the parameters of the initial processing module 108B and object proposal module 108C together using training images 112A-112M in order to output a convolutional feature map with trained proposals. The machine learning module 108E may then train the parameters of the object classifier module 108D with the trained proposals generated by the object proposal module.

Next, the machine learning module 108E can re-initialize the initial processing module and the object proposal module using trained parameters generated in the above-described steps. In various examples, the trained parameters for initialization of the initial processing module can include frozen convolution layers (e.g., the convolution layers do not change). In some examples, the trained parameters for initialization of the object detection module can include frozen convolution layers and frozen parameters in the object proposal module.

After re-initialization of the initial processing module 108B, the machine learning module 108E can further train the parameters of the initial processing module 108B and object proposal module 108C together with training images 112 to output a convolutional feature map with highly trained proposals. Finally, the machine learning module 108E can train the object classifier module 108C with the highly trained proposals generated by the object proposal module 108C, The machine learning module 108E can then set the trained parameters across the initial processing module 108B, the object proposal module 108C, and the object classifier module 108C.

In various examples, the machine learning module 108E can train the system in an initial set-up. In other examples, the machine learning module 108E can train the system 100 periodically, such as, for example, at a specified time each week or month. In some examples, the machine learning module 108E can obtain or access data to train the computer system 100 when manually directed by a user or manager of the platform 104.

Tracking module 108F may be executed on processor(s) 105 and implement and execute computer vision based tracking, model-based tracking, Iterative Closest Point (ICP), and/or Simultaneous Localization and Mapping (SLAM) methods. ICP may be the tracking method of choice if the tracking is done based on depth data only, and SLAM may be the tracking method of choice if the tracking is done primarily based on RGB/grayscale data by itself or combined with depth data. For example, SLAM refers to a class of techniques where a map of an environment, such as a map of an environment being modeled by computing platform 104, is created while simultaneously tracking an image retrieval pose relative to that map.

An example implementation of the computer system 100 is now provided with reference to FIG. 1. The training images 112A-112M are retrieved by the computing platform 104, Each of the training images 112A-112M may include an object 114 that belongs to an object class, which is a class, category, or pattern of the object 114. In some instances, the object 114 may belong to more than one object class. In one embodiment, the object 114 may be an object of interest (e.g., cat, dog, house, chair, sky, bottle and the like) in the training images 112A-112M, and each training image 112A-112M may include one or more objects 114 (e.g., a chair and a bottle). In one embodiment, the object 114 may include the object of interest and attributes of the object of interest, e.g., a green bottle and a yellow chair.

In one embodiment, the computing platform 104 may retrieve the training images 112A-112B using the image retrieval module 106. In one other embodiment, the image retrieval module 106 may be an image capture device, such as a camera. The image capture device may, for example, generate a digital image by photographing one or more objects, such as a chair. This image capture device can be user-controlled, for example, by a robot or a human (not shown). In an alternative embodiment, the image capture device may be automatically controlled, for example, by the computing platform 104 via processor(s) 105. The digital image(s) of the object(s) 114 can then be stored in a database or memory, such as DB 111.

In other embodiments, the computing platform 104 may retrieve the training images 112A-112B using search engines, such as Internet Explorer® and Chrome®, based on a keyword (e.g., book). In still other embodiments, the computing platform 104 may be manually provided with the training images 112A-112B or a predetermined number of object classes for discovery and/or learned from the training images 102, or simply retrieved from storage, such as from DB 111.

After retrieving the training images 112A-112B, the computing platform 104 may automatically and simultaneously localize objects, discover object classes and generate and/or update the trained model(s) 111A, Using the trained model(s) 111A, the computing platform 104 may localize objects and discover object classes of multiple images 118 (e.g., images 118A-118M), which were not previously processed by the computing platform 104. In some embodiments, one individual model of the trained model(s) 111A may be trained to discover an object class. Thus, the individual model corresponds to an object class and functions in identifying objects that belong to that object class. In these instances, the learned individual model may be used to discover and localize objects that belong to the object class in the multiple images 118.

Thus, in the illustrated example, images 118A-118M may be input for analysis using the trained model(s) 111A, and an object 120 (i.e., a chair) may be localized as indicated by a window indicator 122. In some instances, the computer platform 104 may identify the discovered object 120 in the images 118A-118M. For example, the object 120 may be identified as a chair and/or indicate that this discovered object 120 and the object 114 of the training image 112 belong to the same object class.

Figure 2A:
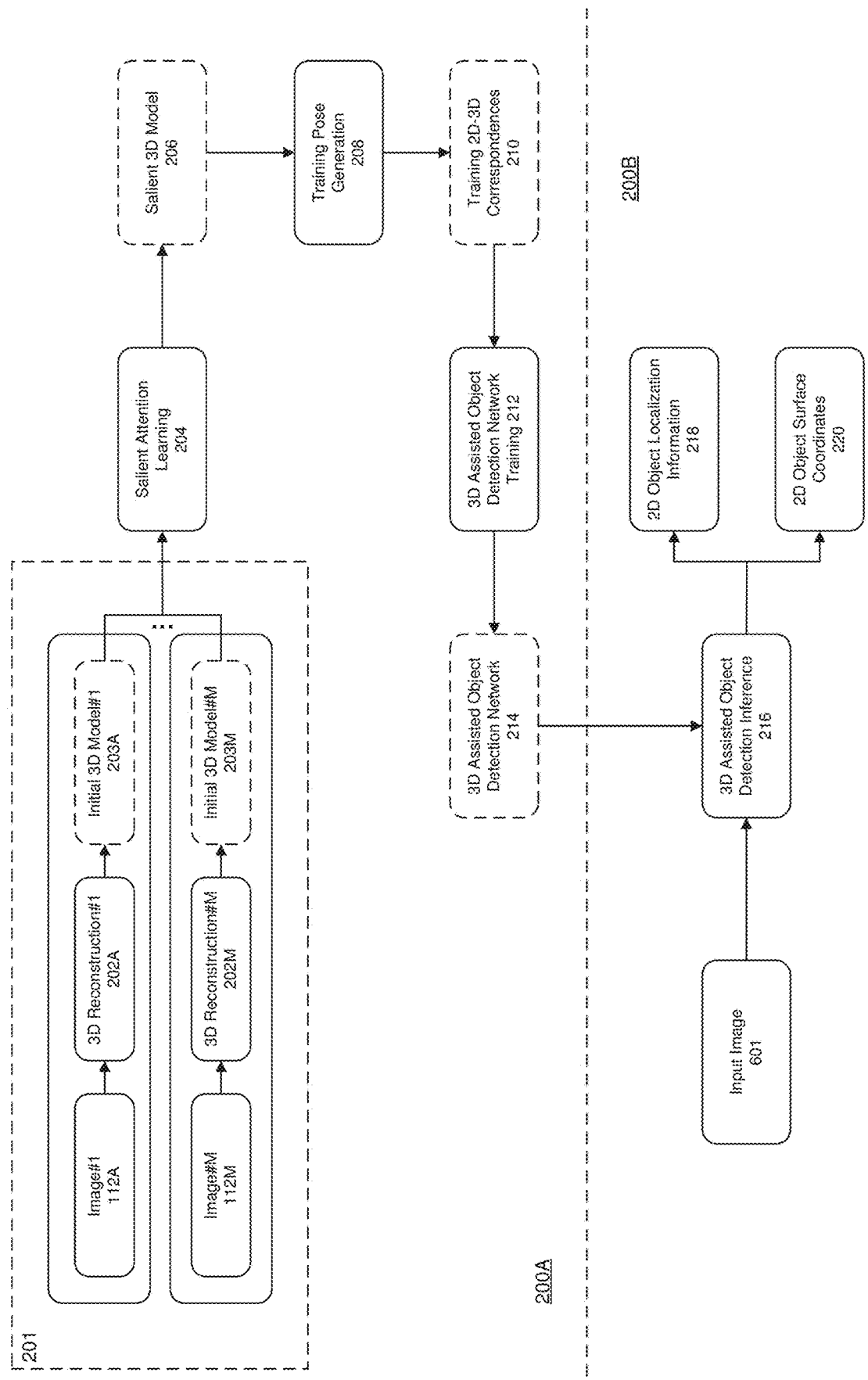
FIG. 2A illustrates an example flow diagram of detecting objects and estimating a pose of the object in accordance with the system of FIG. 1.

FIG. 2A illustrates an example flow diagram of detecting objects and estimating a pose of the object in accordance with the system of FIG. 1. In embodiments, the flow diagrams (including those that follow) may be computer-implemented methods performed, at least partly, by hardware and/or software components illustrated in FIGS. 1-8 and as described above and below. In one embodiment, software components executed by one or more processors, such as processor(s) 105 (FIG. 1) or processor 861 (FIG. 8), perform at least a portion of the methods.

The flow diagram is illustrated as having two stages—a training (or offline or pre-processing) stage 200A and a testing (or online or post-processing) stage 200B. The training stage 200A initially includes the retrieval of training images 112A-112M (or training dataset) of object 114 that are reconstructed at 202A-202M to generate initial three-dimensional (3D) models 203A-203M, together forming stage 201. The initial 3D models 203A-203M are processed in a salient attention learning 203 stage and training pose generation 208 stage to train a 3D assisted object detection network 214 via a 3D assisted object detection network training 212 stage. Once training has been completed, the 3D assisted object detection network 214 may be used for object detection and segmentation in 2D images through a feed forward inference process in the testing stage 200B, described below.

In the training stage 200A, a training image 112 may be obtained automatically or manually. For example, in one embodiment, the object 114 may be placed in a fixed or designated location (e.g., placed on a turn table) such that the computer system 100 may observe multiple viewpoints of object 114 and capture training images 112A-112M of the object 114 from multiple different views. From each of the captured training images 112A-112M, the object 114 (in the example, a chair) is segmented out using well-known techniques, such as background subtraction. For example, in the process of background subtraction, the observed image is compared with the same scene with the exclusion of any objects in the scene. The subtraction from the original scene results in the difference of the two images. In one other embodiment, a user or operator can manually provide the computer system 100 with images of the object 114 from multiple viewpoints together with the segmentation of the object 114.

Using the multiple viewpoints of the training images 112, the computer system 100 will generate an initial 3D model through 3D reconstruction 202A-202M stages. In one embodiment, the multi-view stereo (MVS) method is used to perform 3D reconstruction of the object 114. MVS-based methods exploit photo-consistency of similar patches of the image across multiple images (e.g., images 112A-112M) to find correspondences and triangulate points in 3D. The result of the MVS process is a 3D point cloud of the object 114, which is the initial 3D model 203A-203M. Image processing and 3D reconstruction are discussed in more detail below with reference to FIG. 2B.

The set of initial 3D models 203A-203M are input into the salient attention learning 204 stage, and the system generates the salient 3D model 206 (3D point cloud) of the object 114. The 3D point cloud of the object 114, generated from the different environmental settings and poses during 3D reconstruction, are pairwise registered (initially) through a coarse registration algorithm, such as Random Sample Consensus (RANSAC). In one embodiment, the initial registration may then be refined by an iterative fine registration algorithm, such as ICP.

To generate the salient 3D model 206, the initial 3D models 203A-203M are processed by multiple stages, including but not limited to, a pairwise correspondence generation 204A stage, a bundle adjustment 204B stage that produces an unified initial 3D model 204C, a salient part discovery 204D stage that produces a salient parts 204E and an optional user annotation 204F stage, which is described in more detail below with reference to FIG. 3A.

In one embodiment, the output of the salient attention learning 204 stage, i.e., the salient 3D model(s) 206, may then be used as input into the training pose generation 208 stage. From this input, the training pose generation 208 stage generates a set of training 2D-3D correspondences based on the images 112A-112M from the salient attention learning 204 stage. The salient 3D model(s) 206 are then pruned, for example to reduce noise, via a correspondence pruning 404 stage. In another embodiment, the training pose generation 208 stage receives new training images 402A-402M (which may be processed similar to images 112A-112M) as input. Correspondences between the new training images 402A-402M and the initial training images 112A-112M are found by the correspondence matching 406 stage. As a result of the correspondence matching and pruning, a set of training 2D-3D correspondences are generated as training 2D-3D correspondences 210. A detailed description of the training pose generation 208 stage is found below with reference to FIG. 4A.

The training 2D-3D correspondences 210 output by the training pose generation 208 stage is input into the 3D assisted object detection network training 212 stage. The set of training 2D-3D correspondences 210 may be used by the 3D assisted object detection training 212 stage to learn a deep 3D assisted object detection network 214, which may be employed for object detection and segmentation in 2D images through a feed forward inference process during the testing stage 200B. The 3D assisted object detection network training 212 stage is described in more detail below with reference to FIG. 5.

In the testing stage 200B, new images 601 are input into the 3D assisted object detection network 214 (now trained) for processing. As a result of processing, the 3D assisted object detection network 214 outputs the 2D object localization information 218 (the location of the object in the image) and 3D object surface coordinate 220. A detailed description of the testing stage 200B may be found below with reference to FIGS. 6A and 6B.

Figure 2B:
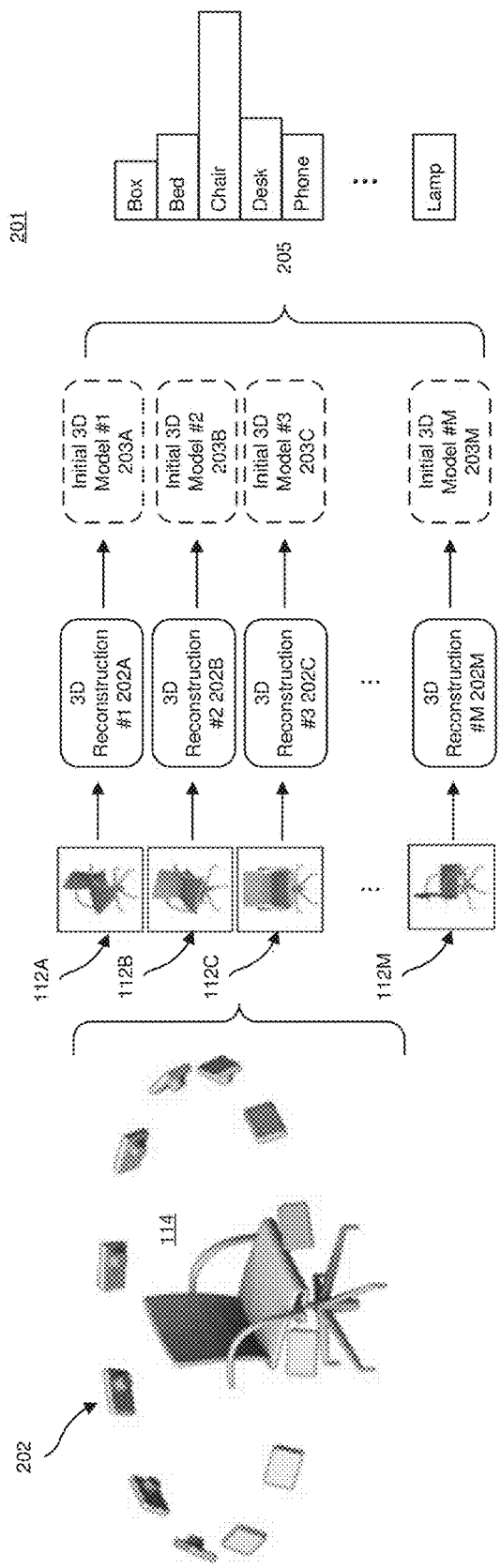
FIG. 2B illustrates an embodiment of image reconstruction and 3D modeling in accordance with stage 201 of FIG. 2A.

FIG. 2B illustrates an embodiment of image reconstruction and 3D modeling in accordance with stage 201 of FIG. 2A. As depicted, and for purposes of discussion, training images 112A-112B are acquired from multiple viewpoints. In one embodiment, a camera 202 is used to capture images 112A-112B (set of images 112 from multiple viewpoints) of the object 114, e.g. a chair. For example, the chair may rotate on a turn table, the chair may be rotated manually by a user or operator, the chair may be rotated automatically by a robot, the camera 202 may rotate about the chair, multiple cameras 202 may be employed around the chair (as shown), etc. In one embodiment, in addition to or as an alternative, the images 112A-112M being taken from multiple viewpoints, the images 112A-112M may also be captured in different environment settings. Environment settings may include, for example, lighting (e.g., different times of the day), object pose (e.g., upside down or a different angles), etc.

Using each of the images 112A-112M taken by camera 202, the computer system 104 may generate an initial 3D model 203A-203M of the object 112 (e.g., chair) through 3D reconstruction 202A-202M. Any number of algorithms may be employed to reconstruct the images into the initial 3D models 203A-203M as understood by the skilled artisan. In one embodiment, the algorithm is the MVS algorithm, discussed above and in Seitz and et al., "A comparison and evaluation of multi-view stereo reconstruction algorithms," IEEE CVPR, 2006. While the scope of such algorithms extends beyond the focus of this disclosure, these algorithms may include fundamental properties such as, but not limited to, scene representation, photo-consistency measure, visibility model, shape prior, reconstruction algorithms and initialization requirements.

Applying the MVS algorithm to the images 112A-112M for reconstruction, the result of the MVS process is a 3D point cloud of the object 114 (i.e., the initial 3D model 203A-203M), as noted above. As appreciated, the 3D point cloud is generally a set of data points in space, where each point in the point cloud records a 3D coordinate (e.g., Cartesian, polar, spherical, etc.) of the point in 3D space. For example, a space (e.g., a living room) can be digitized to form the 3D point cloud using overlapping images taken from one or more angles with respect to the space. More specifically, each point in the space (e.g., the living room) corresponds to 3D coordinates relative to an origin. For example, point A may have Cartesian coordinates $(x_1,y_1,z_1)$ relative to an origin (e.g., N centimeters from an origin in the x, y and z directions), point B may have coordinates $(x_2,y_2,z_2)$ relative to the origin, etc. In some implementations, each point is defined in a global coordinate system that may be arbitrarily defined based on how the data points are gathered. In other implementations, different coordinate systems may be used, and the origin of the specific coordinate system employed may be differently positioned.

In one embodiment, a feature representation can be computed for each point in the point cloud. The feature representations (or feature points) may optionally be pooled (for example, using the CNN of FIG. 6B) across the images from multiple viewpoints to obtain output class predictions 205, such as a box, bed, chair, desk, phone, lamp, etc. More specifically, the feature representations can be a feature vector computed based on the visual appearance of corresponding pixels in the corresponding images 112A-112B from multiple viewpoints, such as the mean or centroids of some clusters found by clustering algorithms. For example, in the case of discrete data points, k-means clustering can include determining an initial number of cluster centers or centroids, and assigning each discrete data point to the cluster centroid that is closest, then recalculating each centroid by averaging all of the points in the cluster. In three-dimensional Cartesian space, averaging points to calculate a centroid can include averaging the coordinates of each point along each respective axis (i.e., the x-coordinate of the centroid can be an average of the x-coordinates of each data point in the corresponding cluster, the y-coordinate of the centroid can be an average of the y-coordinates of each data point in the corresponding cluster, etc.). After the centroids are recalculated, the data points can be re-clustered, and this process can be repeated any number of times until the centroids and the clusters stabilize or converge.

Based on the set of initial 3D models 203A-203M, the computing system 100 generates the salient 3D model 206 of the object 114 through the salient attention learning 204 stage, explained next.

Figure 3A:
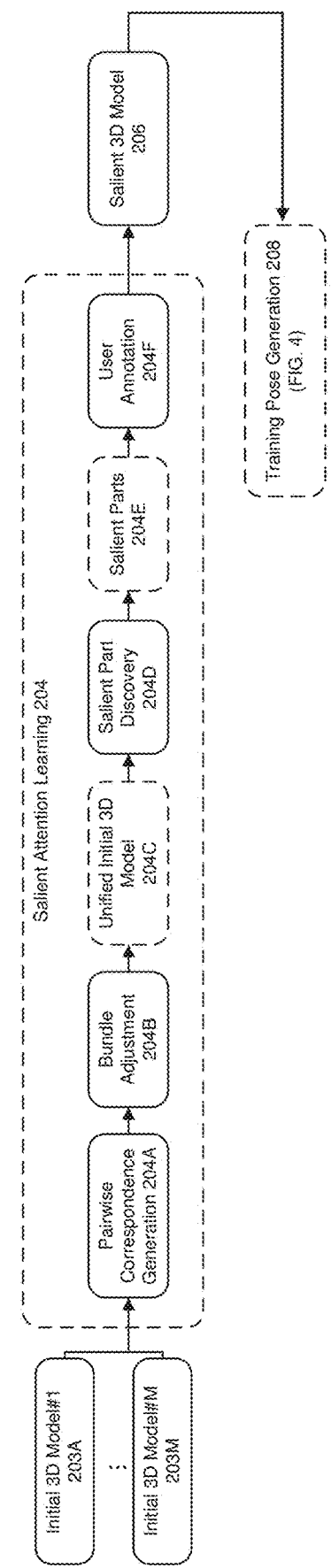
FIG. 3A illustrates a detailed embodiment of the salient attention learning of FIG. 2A.

FIG. 3A illustrates a detailed embodiment of the salient attention learning of FIG. 2A. Based on the set of initial 3D models 203A-203M that form the 3D point cloud, the 3D point clouds (or point sets) for a pair of initial 3D models 203A-203M are registered. During point cloud registration, given two sets of points in different coordinate systems, or in the same coordinate system with different poses and/or environmental settings, a transformation is determined that best aligns one of the point clouds to the other. That is, point cloud registration finds the 3D body transformation such that the 3D coordinates of the point cloud at different angles (viewpoints) can be correctly matched and overlapped. Registration may be accomplished, in one example, using the ICP algorithm. In this method, the transformation parameters of two point sets are calculated through the relationships between the corresponding matching points of the two point sets to satisfy the given convergence precision, and the translation and rotation parameters between the two points are obtained to complete the registration process.

For example, for each pair of initial 3D models 203A-203M, a set of matching 3D points $\{(x_i,y_i,z_i; x_j,y_j,z_j)\}$ are computed by the pairwise correspondence generation 204A stage, which may execute the algorithm. For explanatory purposes, the initial 3D models may defined as initial 3D models $I_i$ and $I_j$, where $(x_i,y_i,z_i)$ is the 3D coordinate of the matching point from $I_i$ and $(x_j,y_j,z_j)$ is the 3D coordinate of the matching point from $I_j$. The matching 3D points may then be calculated using the ICP algorithm, which as noted above, is employed to minimize the difference between two point clouds and reconstructs 2D and 3D surfaces from different poses in different environmental settings. A discussion of the ICP algorithm may be found in J. Yang and et al., "Go-ICP: A Globally Optimal Solution to 3D ICP Point-Set Registration," IEEE Transactions on Pattern Analysis and Machine Intelligence, 38(11): 2241-2254, 2016. However, it is appreciated that numerous other well-known algorithms, such as model-based tracking or Simultaneous Localization and Mapping (SLAM) methods, may also be employed in lieu of or in combination with the ICP algorithm.

After point cloud registration in which the translation and rotation parameters are calculated, and based on the calculated set of 3D matching point sets, a six (6) Degree-of-Freedom (DoF) rotation $R_{ij}$ and $T_{ij}$ translation may be computed by the pairwise correspondence generation 204A stage. During 6 DoF rotation and translation, independent translation and rotation are combined for at least 6 points about three mutually perpendicular axes to describe a complete freedom of movement in 3D space. The DoF are forward/backward, up/down, left/right for translation, and pitch/roll/yaw for rotation. Following the example above, in which 3D matching points are computed, the 6 DoF rotation $R_{ij}$ and translation $T_{ij}$ transforms the initial 3D model $I_i$ to align with the initial 3D model $I_j$ (i.e., a pairwise correspondence is generated between initial 3D model $I_i$ and initial 3D model $I_j$).

Based on the pairwise 3D matching points and the computed pairwise 6 DoF rotations $R'_i$ and translations $T'_i$ calculated in the pairwise correspondence generation 204A stage, a bundle adjustment 204B stage refines the visually reconstructed 3D image and parameters (i.e., camera pose and/or calibration) estimates. In refining the 3D images, the bundle adjustment 204B stage refines the 6 DoF rotations $R'_i$ and translations $T'_i$ to align each of the initial 3D models $I_i$ into a unified 3D world coordinate system (the 3D model after bundle adjustment, where each initial 3D model has a 6DoF pose in the world coordinate system). For example, the 6 DoF pose of one 3D model $I_i$ can be set as the world origin ($R_i$ as an identify matrix, and $T_i$ as a zero vector) and all other 2D models $I_i$ will have a relative 6DoF pose $R_i$ and $T_i$ in the world coordinate system. In one embodiment, the refinement of the 6 DoF uses a bundle adjustment algorithm in which the re-projection error between an observed and predicted image point is minimized. Minimization may be achieved, for example, using nonlinear least-squares algorithms. One example of bundle adjustment is discussed in Lourakis and Argyros, "SBA: A Software Package for Generic Sparse Bundle Adjustment", ACM Trans. Math. Software, 2009, although other refinement techniques may be employed as known in art.

At the conclusion of bundle adjustment by the bundle adjustment 204B stage, the pairwise correspondences among the initial 3D models 202A-202M are established, and a unified initial 3D model 204C is generated by the alignment of each of the initial 3D models 202A-202M. For example, let $(x_u, y_u, z_u)$ be a 3D point in the unified initial 3D model 204C. The 3D point in the unified initial 3D model 204C may then be associated with a set of initial 3D points $\{(x_{ui}, y_{ui}, z_{ui})\}$ from the corresponding initial 3D models $\{I_{ui}\}$, where the association between $(x_u, y_u, z_u)$ and $\{(x_{ui}, y_{ui}, z_{ui})\}$ means that $(x_u, y_u, z_u)$ is generated from $\{(x_{ui}, y_{ui}, z_{ui})\}$ by the bundle adjustment 204B stage. Subsequently, a feature representation can be computed for each point $\{(x_{ui}, y_{ui}, z_{ui})\}$ in the unified initial 3D model 204C by aggregating the corresponding feature representations of $\{(x_{ui}, y_{ui}, z_{ui})\}$ in each of the unified initial 3D models 204C. For example, aggregation of the feature representations in the unified initial 3D model 204C may be performed using the mean of the feature representations of $\{(x_{ui}, y_{ui}, z_{ui})\}$, or the centroids may be found using a clustering algorithm (discussed above and further below). It is appreciated that other mechanism may also be used to compute the aggregation of feature representations, and that the disclosure is not limited to mean of the feature representations or finding centroids using a clustering algorithm. The computed feature representation is then fed as input into a salient part discovery 204D stage of the salient attention learning 204 stage.

According to one embodiment, an unsupervised pattern discovery algorithm may be used to determine a set of 3D salient parts 204E ($S_j$) of the object 114 in the salient part discovery 204D stage. Unsupervised pattern discovery algorithms may be applied, for example, with high accuracy to pattern recognition problems in images, such as an image captured of object 114. In such a case, deep neural networks (DNNs) are trained directly on image data to learn complex image patterns and detect objects based on the complex image patterns. This may be accomplished, for example, by using training datasets (not labeled) and for which a structure or cluster of the training dataset is found in order to determine proper classification, as discussed below. Deep DNNs are discussed below with reference to FIG. 3B.

In one embodiment, the DNN is a deep auto encoder neural network (Deep ANN), described below with reference to FIG. 3C. A deep ANN may be used to find the set of 3D salient parts 204E ($S_j$) of an object, such as object 114. In general, the input layer (an encoder) learns a latent representation for each 3D point $(x_u, y_u, z_u)$ taking the initial feature representation as input. An output layer (decoder) uses the latent representation to reconstruct the initial feature representation. Given two 3D points of the initial 3D model, the corresponding initial feature representations are fed through the deep ANN to generate two final output vectors from the output layer (i.e., a vector from the first 3D point to the second 3D point). Based on the two output vectors, a similarity can be measured between the two 3D points.

From the measured similarity, an affinity graph (not shown) can be computed, where each graph node is a 3D point and edges between nodes are the similarities between 3D points computed based on the output layer from the deep ANN. Unsupervised clustering algorithms, such as k-means or spectral clustering, may then be used to find k-clusters of the 3D points based on the affinity graph, where the k-clusters are the salient parts 204E ($S_j$) of the object 114, discoverable by the computing platform 104. Combining each of the salient 3D points for each of the salient parts 204E ($S_j$) provides the salient 3D model 206 of the object 114.

In one embodiment, the 3D salient parts 204E ($S_j$) of the object 114 may be optionally presented to a user or operator at a user annotation 204F stage of the computing platform 104 to acquire additional guidance on the 3D salient parts 204E ($S_j$). For example, for each salient part 204E ($S_j$), the user selects a set of salient 3D points $\{s_j\}$ as salient landmarks for an identified salient part 204E ($S_j$). Combining each of the salient 3D points $\{s_j\}$ for each of the salient parts 204E ($S_j$) together provides the final salient 3D model 206 of that object 114. The final salient 3D model 206 then serves as input to the training pose generation 208 stage.

Figure 3B:
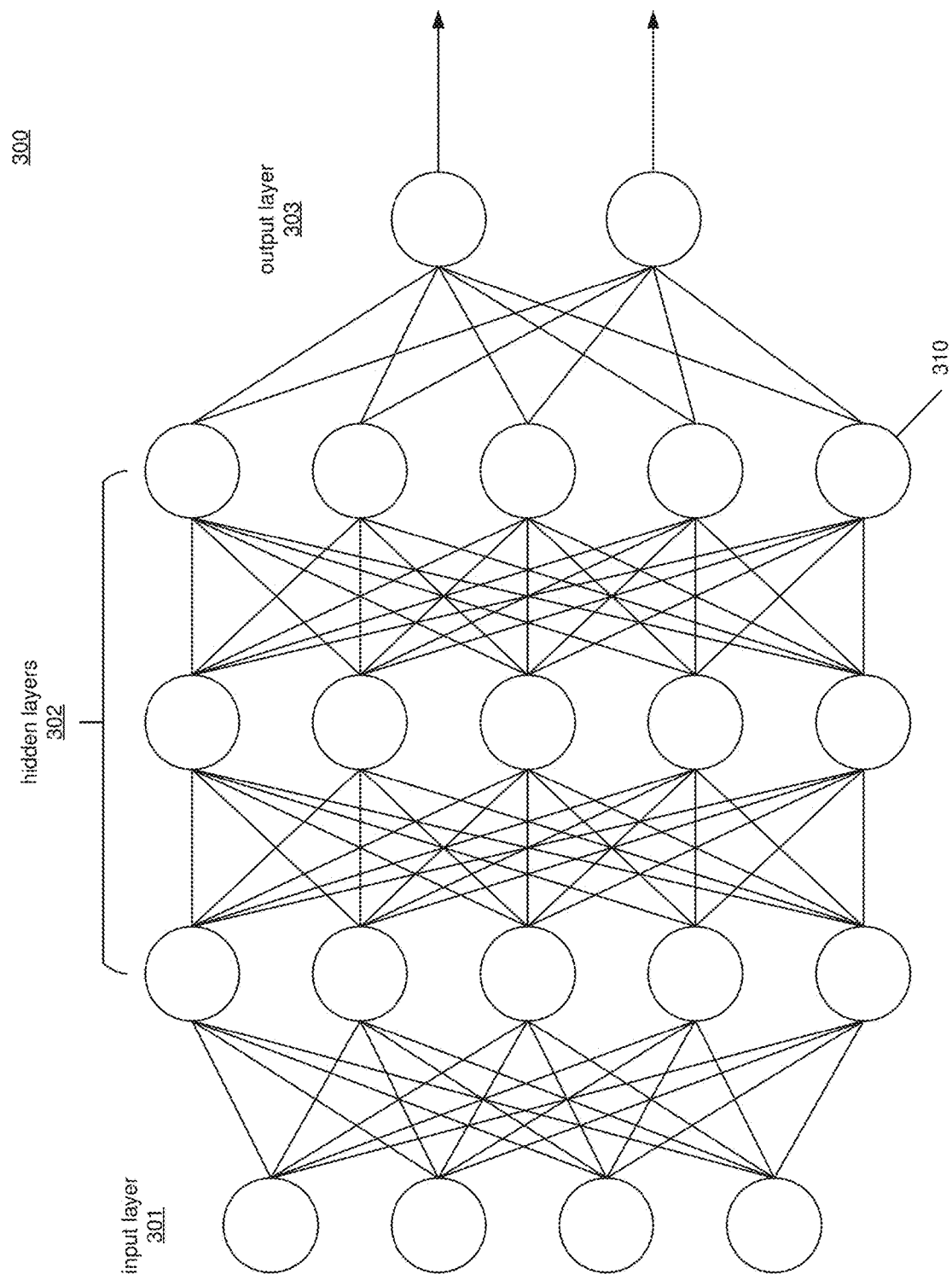
FIG. 3B illustrates an exemplary deep neural network (DNN) in which embodiments of the present technology may be implemented.

FIG. 3B illustrates an exemplary deep neural network (DNN) in which embodiments of the present technology may be implemented. The DNN 300 includes an input layer 301, a plurality of hidden layers 302, and an output layer 303. In one embodiment, the DNN 300 is a deep ANN used to find the set of 3D salient parts 204D of an object, as described in FIG. 3A. An example deep ANN is described in more detail below with reference to FIG. 3C.

As illustrated, the DNN 300 has three hidden layers 302, although it is understood that alternative embodiments may have any number of two or more hidden layers 302. Each layer 301 to 303 may have one or more nodes 310. It is understood that alternative embodiments may have fewer or more nodes 310 than what is depicted. In one embodiment, every node 310 in a current layer in the DNN 300 is connected to every node 310 in a previous layer and a next layer. This is referred to as a fully-connected neural network. Other neural network structures are also possible in alternative embodiments of the DNN 300, in which not every node 310 in each layer is connected to every node 310 in the previous and next layers.

In one embodiment, each node 310 in the input layer 301 may be assigned a value and may output that value to every node 310 in the next layer (a hidden layer 302). The nodes 310 in the input layer 301 (input nodes 310) may represent features about a particular environment or setting. For example, a DNN 300 that is used for classifying whether an object 114 is a rectangle may have an input node 310 that represents whether the object 114 has flat edges. As such, assigning a value of 1 to the node may represent that the object does have flat edges and assigning a value of 0 to the node may represent that the object does not have flat edges. There may be other input nodes 310 in the input layer 301 that may represent other features, such as whether the object 114 has corners with angles of ninety degrees. Similarly, for a DNN 300 that takes in an image as input, the input nodes 310 may each represent a pixel of an image, such as a pixel of training image 112, where the assigned value may represent an intensity of the pixel. For example, an assigned value of 1 may indicate that the pixel is completely black and an assigned value of 0 may indicate that the pixel is completely white.

Each node 310 in the hidden layers 302 (hidden node 310) may receive an outputted value from one or more nodes 310 in a previous layer (e.g., input layer 301) and associate each of the one or more nodes 310 in the previous layer with a weight. Each hidden node 310 may then multiply each of the received values from the one or more nodes 310 in the previous layer with the weight associated with the one or more nodes 310 in the previous layer and output the sum of the products to each of the one or more nodes 310 in the next layer.

Nodes 310 in the output layer 303 (output nodes 310) handle input values received from hidden nodes 310 in a similar fashion as previously described with respect to the hidden nodes 310 in the previous layer. In one embodiment, each output node 310 may multiply each input value received from each of the nodes 310 in the previous layer (hidden layer 302) with a weight and sum the products to generate an output value. The output values of the output nodes 310 may supply desired information in a predefined format, where the desired information may have some relationship to the information (input) supplied to the output nodes 310. Examples outputs may include, but are not limited to, classifications, relationships, measurements, instructions, and recommendations.

As an example, a DNN 300 that classifies whether an image is a rectangle or an ellipse may have a first output node 310 for indicating whether the object 114 is a rectangle (or not), where an outputted value of 1 represents that the object 114 is a rectangle and an outputted value of 0 represents that the object 114 is not a rectangle. A second output node 310 may indicate whether the object 114 is an ellipse (or not), wherein an outputted value of 1 from the second output node 310 represents that the object 114 is an ellipse and an outputted value of 0 represents that the object 114 is not an ellipse. While the examples provided above relate to classifying geometric shapes, this is only for illustrative purposes, and the output nodes 310 of a DNN 300 may be used to classify any of a wide variety of objects and other features and otherwise output any of a wide variety of desired information in desired formats.

Figure 3C:
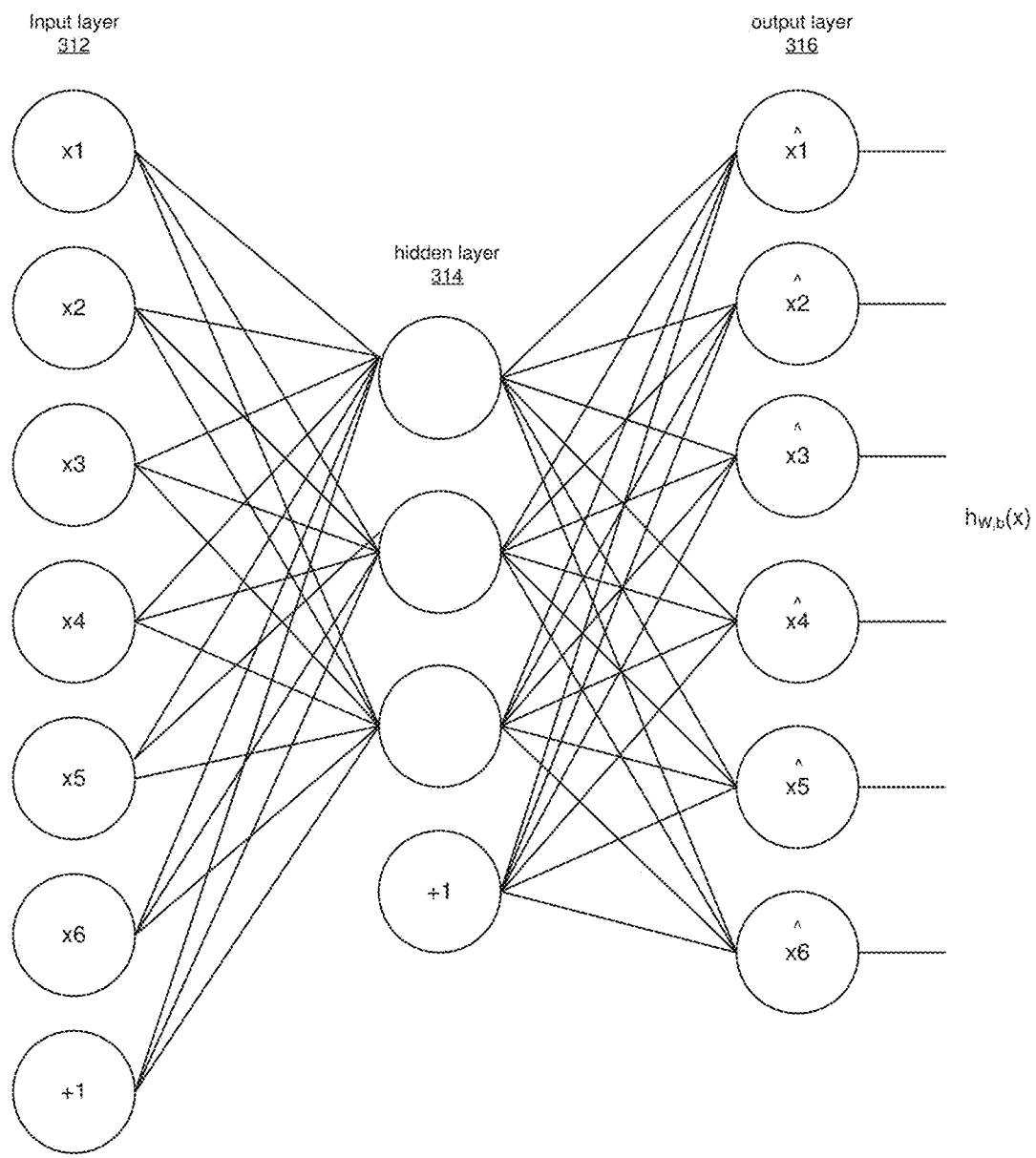
FIG. 3C illustrates an example Deep ANN as an unsupervised learning algorithm.

FIG. 3C illustrates an example Deep ANN as an unsupervised learning algorithm. The ANN 311 is a feed-forward neural network with one hidden layer 314, although additional layers may be used. The ANN 311 has an input layer 312 (with training examples $x_1, x_2, \ldots$), a hidden layer 314 and an output layer 316 (with outputs $x^{\wedge}1, x^{\wedge}2, \ldots$). The ANN 311 learns a function $h_{W,b}(x) \approx x$, where 'W' is a weighted average and 'b' is a bias. That is, the ANN 311 learns an approximation to the function so as to output $x^{\wedge}$ that is similar to x. If the ANN 311 is a fully-connected network, each node in the input layer 312 can correspond to a respective pixel (or voxel) of an image patch, where each input layer 312 has the same number of nodes as the output later 315 (ignoring the bias term 'b' (i.e., the nodes labeled as "+1")).

As briefly explained above, the goal of the ANN 311 is to minimize the difference between the input and output vectors (e.g., vectors from an input 3D point and a vector from an output 3D point). The nodes of the hidden layer 314 can be calculated as a function of the bias 'b' and the weighted sum 'W' of the nodes of the input layer 312, where a respective weight is assigned to each connection between a node of the input layer 312 and a node in the hidden layer 314. The bias term 'b' and the weights 'W' between the input layer 312 and the hidden layer 314 are learned in the training of the ANN 311, for example using a backpropagation algorithm. The nodes of the hidden layer 314 can be considered to be features extracted from the pixels (represented by the nodes of the input layer 312) of an input image patch, and the learned weights can be considered to be filters that filter the input image data to generate the feature representations. Stated differently, the ANN 311 learns a latent representation for each input taking the initial feature representation as an input, such that the output layer 316 uses the latent representation to reconstruct the initial feature representation, as described above with reference to FIG. 3A.

Figure 4A:
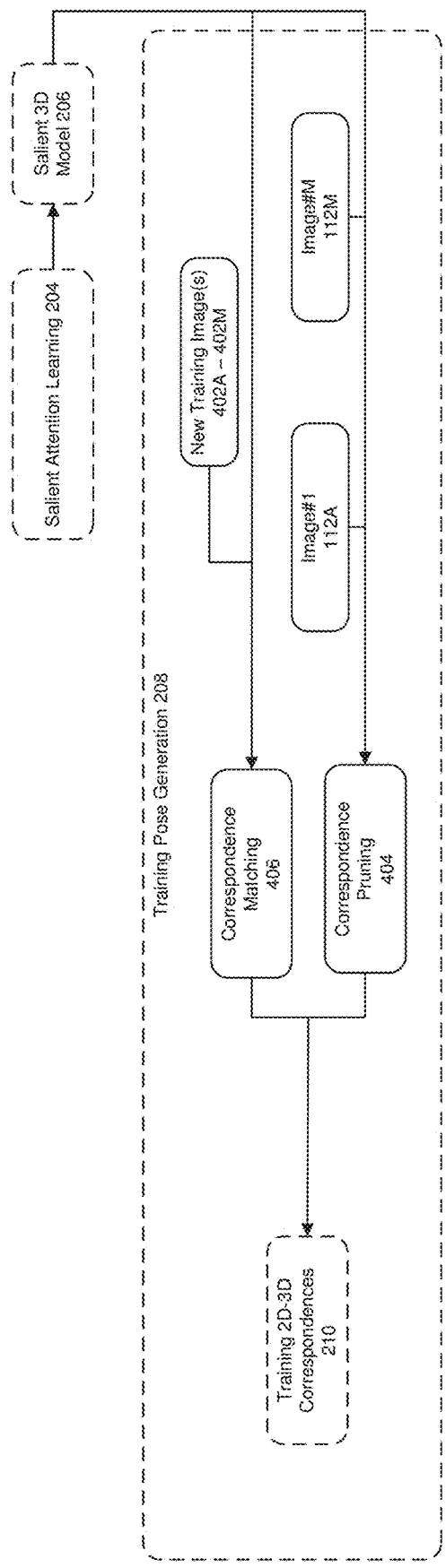
FIG. 4A illustrates a detailed embodiment of the training pose generation stage of FIG. 2A.
Figure 4B:
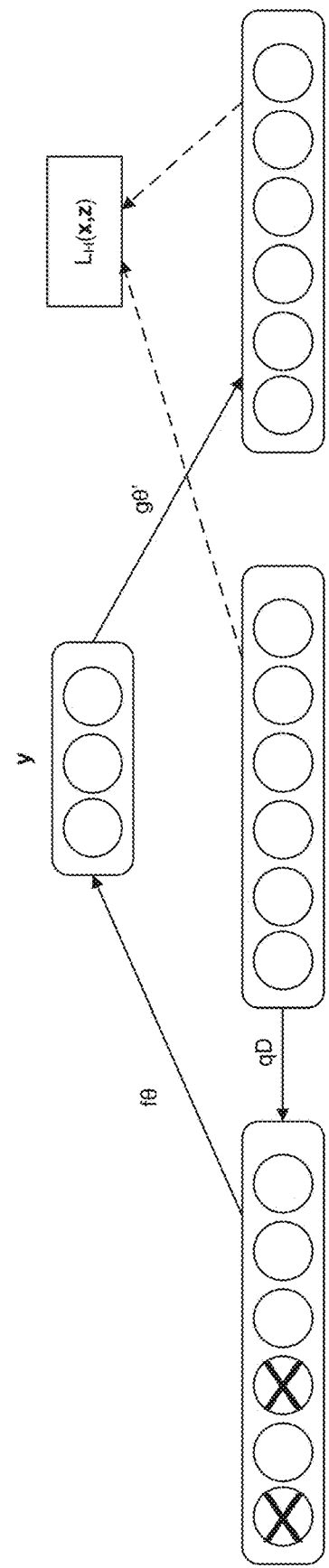
FIG. 4B illustrates an example embodiment of an auto-encoder.

FIG. 4A illustrates a detailed embodiment of the training pose generation stage of FIG. 2A. In the depicted embodiment, the training pose generation 208 stage generates a set of training 2D-3D correspondences from the input salient 3D models 206. In one embodiment, the original set of images 112A-112M used to generate the unified initial 3D model 204C may also be used to obtain training 2D-3D correspondences 210 for the training phase. The training 2D-3D correspondences 210 may be obtained since each salient 3D point $s_j = (x_{sj}, y_{sj}, z_{sj})$ of the salient 3D model 206 has an associated 3D point $(x_{sji}, y_{sji}, z_{sj})$ in the $i^{th}$ initial 3D model 202A-202M. Each salient 3D point $s_j = (x_{sj}, y_{sj}, z_{sj})$ is also associated with a set of 2D points $\{(p_{sjik}, q_{sjik})\}$ in the original set of images 112A-112M. Accordingly, each salient 3D point $(x_{sji}, y_{sji}, z_{sji})$ associated with a set of 2D points $\{(p_{sjik}, q_{sjik})\}$ is defined as $(I_{sj}, x_{sj}, y_{sj}, z_{sj}, \{(p_{sjik}, q_{sjik})\})$, which provides a 2D-3D correspondence between the original set of images 112A-112M and the salient 3D model 206. Recall from above, each k-cluster of 3D points based on the affinity graph corresponds to a salient part $s_j$ of the object 114. Thus, $I_{sj}$ represents a part label (or cluster index) of a 3D point for each k-cluster in the salient 3D model 206.

In some embodiments, a training correspondence refining process may also be employed to fine-tune the 2D points $\{(p_{sjik}, q_{sjik})\}$ in the images 112A-112M. Fine-tuning provides more accurate ground-truth 2D-3D correspondences for training. Within the context of vision systems, ground-truth is a set of measurements that is known to be more accurate than the measurements from the system being tested. Thus, through the refining process, the original set of images 112A-112M may be pruned by a correspondence pruning 404 stage in order to fine-tune the 2D points $\{(p_{sjik}, q_{sjik})\}$ to thereby provide the more accurate ground-truth 2D-3D correspondences. In particular, correspondence pruning reduces noise (i.e., denoises) in the images 112A-112M and provides the more accurate ground-truth 2D-3D correspondences for training. To reduce image noise, numerous methods may be employed, including but not limited to various deep network based approaches such as a denoising autoencoder (DA), a stacked denoising autoencoder and multilayer perceptrons (fully-connected layers), as discussed in Burger et al., "Image Denoising: Can Plain Neural Networks Compete with BM3D?" CVPR, 2012. An example of pruning using a denoising autoencoder is described below with reference to FIG. 4B.

In one embodiment, new training images 402A-402M may be captured from the object 114 to obtain more 2D-3D correspondences for additional training. When new training image(s) 402A-402M are provided, the computer platform 104 processes them in accordance with the procedures described above with respect to FIGS. 1, 2A-2B and 3A-3C. Using these new training images 402A-402M, the computer platform 104 determines object segmentation and correspondences between the new training images 402A-402M and the original set of images 112A-112M by the correspondence matching 406 stage. For example, the MVS-based method used in building the initial 3D models 203A-203M may be used to acquire such information.

As a result of MVS-based method, a new set of 3D points $\{(x_{un}, y_{un}, z_{un})\}$, different from the initial 3D points $\{(x_{ui}, y_{ui}, z_{ui})\}$ in the unified initial 3D model 204C, of the initial 3D models 203A-203M is generated (in this case, the initial 3D models 203A-203M correspond to the new training images 402A-402M). In one embodiment, and similar to the process described above, each new 3D point $\{(x_{un}, y_{un}, z_{un})\}$ is represented by a feature representation generated from the 2D points of the new training images 402A-402M and the corresponding original set of images 112A-112M. Based on the feature representation, each new set of 3D points $\{(x_{un}, y_{un}, z_{un})\}$ is compared with the 3D points $(x_{ui}, y_{ui}, z_{ui})$ in the unified initial 3D model 204C of the object 114, and a rotation and translation can be computed to align the new set of 3D points $\{(x_{un}, y_{un}, z_{un})\}$ into the unified 3D coordinate with the unified initial 3D model 204C 6 DoF, in the manner described above.

In one embodiment, the initial feature representation of each new 3D point $\{(x_{un}, y_{un}, z_{un})\}$ is used to generate an input for the salient part discovery 204D stage, and through feed forward computation, such as through Deep ANN 311, an output is computed. In this case, the output may be a feature vector based on which the similarity between the new 3D points $\{(x_{un}, y_{un}, z_{un})\}$ and the landmarks (salient 3D points) of the salient 3D model 206 can be computed such that a set of closest landmarks to the new 3D points $\{(x_{un}, y_{un}, z_{un})\}$ are found. As described above, landmarks may be calculated during the training process, which process identifies landmark points on each training image. Landmark features of each image point are determined in the training image based on these landmark points.

In one further embodiment, a new salient 3D point of the salient 3D model can be computed by interpolating the set of closest landmarks. A label (or part label) can be assigned to the interpolated salient 3D point based on the part labels of the closest landmarks, for example, by majority voting. Interpolation enriches the 3D points of the 3D salient model to obtain more training data for learning the 2D-3D correspondence. For example, when an image is categorized, it is also assigned a label or part label. A label or part label is meaningful tag, category, or ID that is informative or that provides information desirable to know about the image. For example, a label or part label might be, but is not limited to, whether the image contains a chair or a table, or whether the chair includes, but is not limited to, arm rests, a back, etc. Thus, a label or part label can provide a description of the content of the image or image parts. Labels and part labels may also be referred to as a cluster index, as the cluster of objects or object parts may be labeled using such a cluster index. Various majority (or ensemble) voting algorithms may be employed, including but not limited to, bagging, boosting, AdaBoost, stacked generalization, mixture of experts, etc.

The interpolated salient 3D point, its label, and the original set of corresponding 2D points from the new set of images 402A-402M and the corresponding original set of images 112A-112M gives a new 2D-3D correspondence 210 for additional training.

FIa 4B illustrates an example embodiment of an autoencoder. The depicted embodiment shows a denoising autoencoder as a mechanism in which to reduce image noise, for example, during the correspondence pruning 404 stage. A denoising autoencoder (DAF) is trained to reconstruct a clean (repaired) input from a corrupted version. For example, the initial input x (which may be, for example, an image 112A-112M) is stochastically corrupted (via qD) to $x^\sim$. The autoencoder maps the corrupted input to y (via encoder fθ) and reconstructs x via decoder gθ', producing reconstruction z. A reconstruction error may then be measured by the loss $L_H(x,z)$. More specifically, the initial input x is corrupted into $x^\sim$ by means of a stochastic mapping $x^\sim \sim qD(x^\sim|x)$ from which $z=gθ'(y)$ is reconstructed. Corrupted input $x^\sim$ is then mapped to a hidden representation $y=fθ(x^\sim)=s(Wx^\sim+b)$, similar to the autoencoder of FIG. 3C. Parameters θ and θ' are trained to minimize the average reconstruction error over a training set such that z is as close as possible to the uncorrupted input x. The key difference is that z is now a deterministic function of $x^\sim$ rather than x. Parameters are initialized at random and then optimized by stochastic gradient descent, described below with reference to FIG. 5.

It is appreciated that while the disclosed embodiment refers to a denoising autoencoder, any number of different denoising mechanisms may be employed.

Figure 5A:
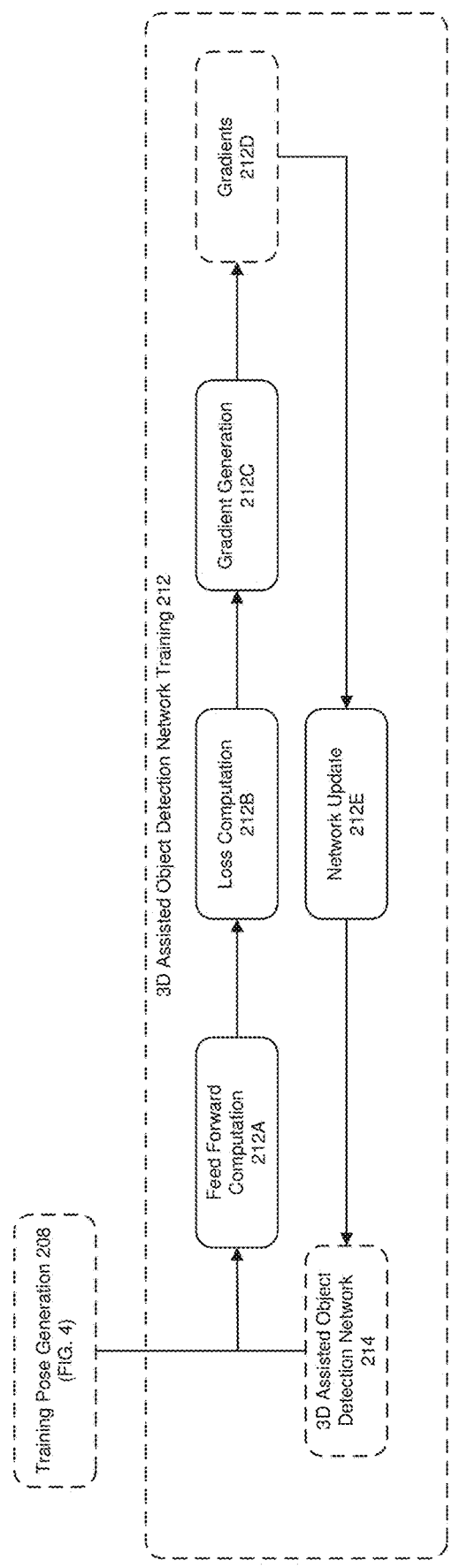
FIG. 5A illustrates a detailed embodiment of the 3D assisted object detection network training stage of FIG. 2A.

FIG. 5A illustrates a detailed embodiment of the 3D assisted object detection network training stage of FIG. 2A. The 3D assisted object detection network training 212 stage includes, but is not limited to, a feed forward computation 212A stage, a loss computation 212B stage, a gradient generation 212C stage, gradients 212D, a network update 212E stage and a trained 3D assisted object detection network 214.

As input, the 3D assisted object detection network training 212 stage receives 2D-3D correspondences 210 generated from the training pose generation 208 stage. As noted above, the set of training 2D-3D correspondences are used by a 3D assisted object detection training 212 stage to learn a deep 3D assisted object detection network 214. More specifically, given the set of training 2D-3D correspondences 210 from the training pose generation 208 stage, for each 2D-3D correspondence, the computer platform 104 generates an input to feed into the deep 3D Assisted Object Detection Network Training 212 stage based on the 2D points of the 2D-3D correspondences 210.

In one embodiment, the input is fed to the feed forward computation 212A stage, which is implemented for example using deep ANN 311 (FIG. 3C), discussed above. The result of the feed forward computation by the feed forward computation 212A stage is an output of 2D points of the 2D-3D correspondence, including the part label of the 2D point (i.e., a 2D point for each cluster), as described above. The loss between the output 2D points and the ground-truth 2D points, as well as the loss between the output part label and the ground-truth part label, can be computed using a loss function (or cost function) in the loss computation 212B stage. As appreciated, a loss function is used to measure the inconsistency between a predicted value ($x^{[<]BEGINITALm}$) and an actual label (x) to effectively evaluate how well an algorithm models a dataset (e.g., images). That is, the difference between the predicted value and the actual value (label) computed by the ANN 311, based on its current weights, is referred to as the loss—the goal being to minimize the average loss over the training dataset. Any number of different loss functions may be implemented in machine learning, including but not limited to, mean squared error, likelihood loss, cross entropy loss, etc.

Gradients 212D of the loss function can be calculated by the gradient generation 212C stage, for example, using backpropagation. Based on the calculated gradients and the loss computation, the computer platform 104 may update the network parameters (e.g., weights and biases). Many optimization methods can be used to update the parameters of the computing system 100 (FIG. 1) in the network update stage 212E, such as gradient descent, stochastic gradient descent (SGD) or adaptive movement estimation (Adam). The gradient descent algorithm, for example, minimizes the loss function (cost function), which as explained above, is used to monitor the error in predictions of the machine learning model. Thus, minimizing the loss function effectively obtains the lowest error value or increases the accuracy of the machine learning model. The accuracy is increased by iterating over the training data, while tweaking the parameters (e.g., weights and biases). The stochastic gradient descent is similar to the gradient descent, but does not accumulate weight updates. Instead, the weights are updated after each training sample. The Adam optimization algorithm is an extension to the stochastic gradient descent.

Figure 5B:
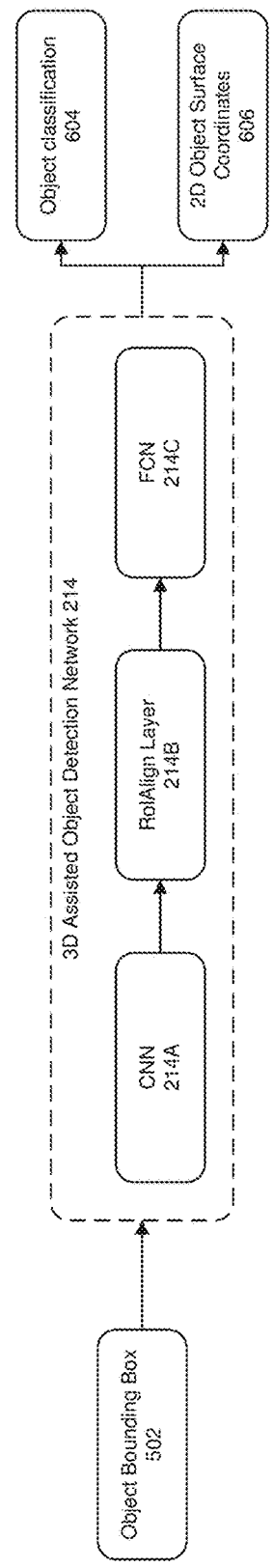
FIG. 5B illustrates a detailed embodiment of the 3D assisted object detection network in FIG. 5A.

Network updates 212E may be applied during the 3D assisted object detection network training 212 stage to generate the 3D assisted object detection network 214, as detailed in FIG. 5B. The 3D assisted object detection network 214 will permit the system to estimate an object pose during the testing stage 200B from a 2D image of an object

114 without performing 3D reconstruction, which is complex and prone to errors during 3D reconstruction.

FIG. 5B illustrates a detailed embodiment of the 3D assisted object detection network in FIG. 5A. In one embodiment, the 3D assisted object detection network 214 includes a deep convolutional neural network (CNN) 214A, a RoIAlign layer 214B stage and a fully-connected convolutional network (FCN) 214C. The FCN 214C outputs 2D object localization information 604 and 2D object surface coordinates 606.

In one embodiment, the input into the 3D assisted object detection network 214 are the pixels of the object 114 in an image 112A-112M, which object (or object part) may be defined by an object bounding box 502, described below. Prior to convolution, the image 112A-112B may optionally be pre-processed to resize the images, normalize the input data values (e.g., the pixels), etc. Such pre-processing helps to ensure, for example, that image sizes do not vary too much from image to image, and that each input data value, for example in the case of normalization, has a similar data distribution.

To train the 3D assisted object detection network 214, a deep CNN is used to process the input. Any number of different deep CNNs can be used as the deep CNN to process the input. For example, in one embodiment, the deep CNN may be the CNN 214A of FIG. 6B, described below. In another embodiment, the deep CNN may be a ResNet50, such as described in K. He, et al., "Deep residual learning for image recognition", CVPR 2016. Numerous other CNNs may be employed, including but not limited to, LeNet, AlexNet, Overfeat, VGG-16, GoogLeNet, etc.

The CNN 214A extracts features (using the techniques described above and below) of the input images 112A-112M, and applies a CNN region proposal method to create regions of interest (RoIs) of the object of interest. Specifically, the region proposal method takes output feature maps from the deep CNN 214A as input, and slides filters over the feature maps to create the regions proposals (the RoIs) using the deep CNN. The RoIs are then pooled to warp them into a fixed dimension, and the output of the deep CNN 214A is fed into a region of interest (RoI) alignment (RoIAlign) layer 214B, along with feature maps of the images 112. The RoIAlign layer 214B is responsible for refinement of the RoI pooling by aligning boundaries of target and input feature maps. R. Guler, N. Neverova, I. Kokkinos, "DensePose: Dense human pose estimation in the wild," CVPR 2018 describes one example of a RoIAlign layer 214B, although other techniques may be employed.

The output of the RoIAlign Layer 214B is fed into a fully convolutional network (FCN) 214C for object (or background) classification and 2D object surface coordinates 606 (e.g., estimated 2D object surface coordinates of each pixel). Classification of each pixel in the object bounding box 502 may be accomplished using, for example, the SVM-based method described above. As a result of classification, a set of K+1 probabilities is determined that indicates the probability of a pixel belonging to k-object parts or the non-object background (non-object part). That is, the pixels associated with each object part or non-object background are classified according to their probabilities, such as a classification score.

The estimated 2D object surface coordinates 606 of each pixel are generated based on the classification result. In one embodiment, the FCN 214C of the 3D assisted object detection network 214 has a regressor for each object part in the salient 3D model 206. The regressor corresponding to an assigned part label (e.g., each object part may be assigned a label or index) may be used to compute the surface coordinates within that object part. Thus, given the ground-truth training 2D-3D correspondences, each regressor is trained using the training 2D-3D correspondences with the corresponding part label.

In one embodiment, the FCN 214C is described in R. Guler, N. Neverova, I. Kokkinos, "DensePose: Dense human pose estimation in the wild," CVPR 2018.

Figure 6A:
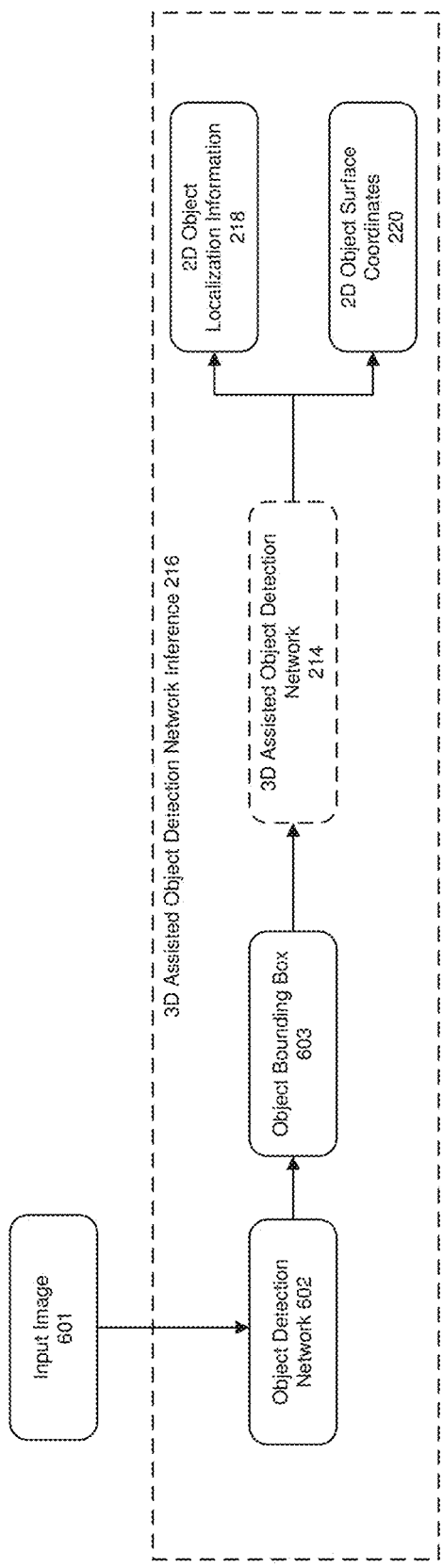
FIG. 6A illustrates an example embodiment of a testing stage in accordance with testing stage 200B of FIG. 2A.

FIG. 6A illustrates an example embodiment of a testing stage in accordance with testing stage 200B of FIG. 2A. In the testing stage 200B (post-training), the trained 3D assisted object detection network 214 is used to infer objects from a new dataset (e.g., new or input images 601). In one embodiment, new images 601 are input into an object detection network 602 of the 3D assisted object detection network inference 216 stage of the feed forward inference process. The object detection network 602 detects object bounding boxes 603 from the new images 601 (object bounding boxes are explained further below), and sends the object bounding boxes 603 to the 3D assisted object detection network 214 (now trained) for to detecting and segmenting the new images 601. As a result of detection and segmentation, the 3D assisted object detection network 214 outputs the 2D object localization information 218 and 3D object surface coordinates 220 of the new images 601.

For example, given one or more new images as input images 601 (e.g., new 2D images), the object detection network 602 may detect object bounding boxes 603. An object bounding box 603 (pixels of the object in the input image defined by the object bounding box) is input into the 3D assisted object detection network 214. As appreciated, the object bounding box 603 defines segments or a part of an image 601, such that the boundary or portion of the boundary of the object 114 of interest in a particular image 601 may be defined. In one embodiment, the object proposal module 108C (FIG. 1) generates the object bounding box 603. Although any number of object detection networks may be used, examples include YOLO, described in J. Redmon, A. Farhadi, "YOLO9000: Better, Faster, Stronger", CVPR 2017, or Faster R-CNN, as described in S. Ren, et al., "Faster R-CNN: Towards real-time object detection with region proposal networks", NIPS, 2015.

Once the object bounding box 603 is fed into the deep 3D assisted object detection network 214 as input, the pixels may be processed by the 3D assisted object detection network 214, as described above with reference to FIG. 5B. As a result of the processing, the 3D assisted object detection network 214 outputs the 2D object localization information 218 and the 2D object surface coordinates 220 of the new images 601, which information may be used to estimate the pose (i.e., position and orientation) of object 114 from the new images 601.

In one embodiment, 2D object localization information 218 may be determined using a regressor (such as a linear regressor) in which the regressor regresses rendered images to their ground truth pose parameters. In some embodiments, the regressor may be trained by mapping an image to the ground truth pose by minimizing the Euclidean loss between the regressor and the ground truth pose. In one other embodiment, the 2D object surface coordinates 220 are output in the manner described above, with reference to FIG. 5B.

In one embodiment, the output is obtained using 2D images (new images 601) as input into the trained network (i.e., the 3D assisted object detection network 214) without performing any 3D reconstruction during the post-training (i.e., testing) process. Obtaining such information without the use of 3D reconstruction during post-training reduces the complex and error prone process of 3D reconstruction.

Figure 6B:
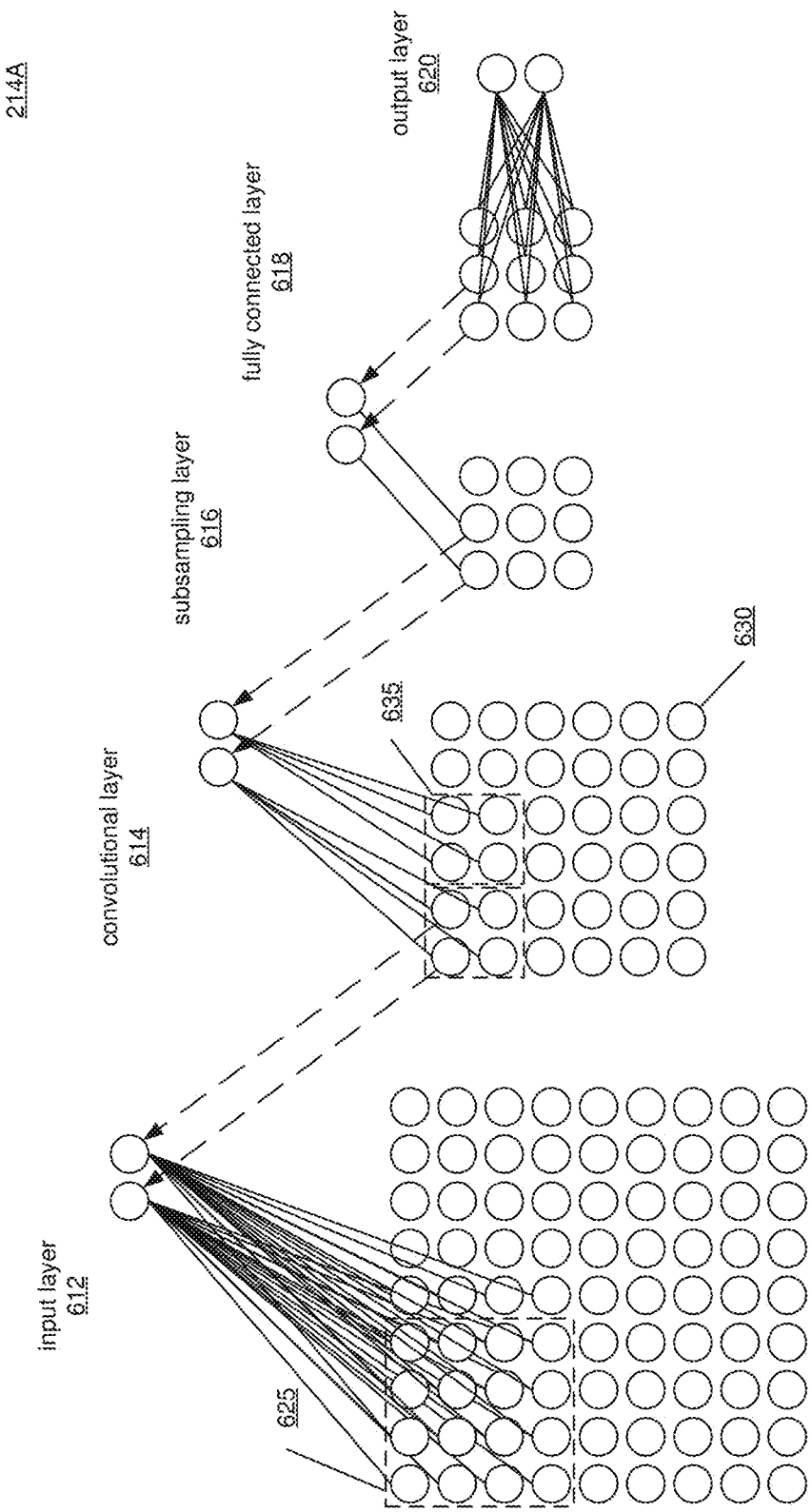
FIG. 6B illustrates an example deep CNN. The example CNN is a DNN layer that structures computations as a convolution.

FIG. 6B illustrates an example deep CNN. The example CNN is a DNN layer that structures computations as a convolution. CNN 214A includes an input layer 612, a convolutional layer 614, a pooling layer 616, a fully connected layer 618, and an output layer 620. It is understood that in alternative embodiments, the CNN 214A may have additional convolutional layers 614 and pooling layers 616. In one embodiment, the alternating convolutional layers 614 and pooling layers 616 may be followed by more than one fully connected layer 618. The dashed arrows in the figure indicate nodes that are isolated in the drawing to more clearly demonstrate their connectivity to nodes in a previous layer. Thus, the circles at the two ends of the dashed arrows represent the same node. Accordingly, the dashed arrows do not represent connections between different nodes.

A CNN 214A is a type of DNN 300 (FIG. 3C) that may include additional features, such as local receptive fields, shared weights, and pooling. The input layer 612 and output layer 620 of a CNN 214A function similar to the input layer 301 and output layer 303 of the DNN 300. The CNN 214A is distinguished from the DNN 300 in that the hidden layers 302 of the DNN 300 are replaced with one or more convolutional layers 614, pooling layers 616, and fully connected layers 618. The use of localized receptive fields involves having nodes 630 in the convolutional layers 614 of a CNN 214A receive inputs from localized regions 625 in the previous layer. Other layers may also be added, such as a non-linearity layer and a normalization layer, each of which are discussed above.

Unlike the nodes 310 of the hidden layers 302 in FIG. 3C, nodes 630 in a convolutional layer 614 do not receive an outputted value from every node 630 in the previous layer. Rather, each node 630 in the convolutional layer 314 receives an outputted value only from nodes 630 within a localized region 625 in the previous layer. In one embodiment, the localized region 625 is a 4×4 set of nodes 630 in the input layer 612, as depicted. It is understood that the localized region 625 may be larger or of a different shape in alternative embodiments. Each 4×4 region 625 (i.e., localized region) in the input layer 612 corresponds to a node 630 in the convolutional layer 614 such that each node in the convolution layer 614 maps onto a different 4×4 region 625 of the input layer 612.

The use of shared weights is another feature of the convolutional layer 614. Each node 630 in the convolutional layer 614 may assign a weight to each of the outputted values of the nodes 630 in the localized region 625. Unlike the DNN 300 in FIG. 3C, where different nodes 310 in a hidden layer 302 may assign a different set of weights to the outputted values received from a previous layer, nodes 630 in a convolutional layer 614 assigns the same set of weights to the values outputted by the nodes 630 in the localized region 625 corresponding to the node 630 on the convolutional layer 614.

As illustrated, two of the nodes 630 in the convolutional layer 614 have been isolated, as indicated by the dashed arrows, to illustrate their connectivity to the nodes 630 within the localized regions 625 on the input layer 612. As noted above, nodes in a convolutional layer 614 of a CNN 214A all use the same set of weights with respect to positions on localized regions 625 of a previous layer. For example, for a localized region 625 consisting of 9 nodes 630 arranged in a 3×3 square, nodes 630 on the left and right columns may be assigned a weight of zero while the nodes 630 in the center column may be assigned a weight of one.

For a CNN 214A that takes in a set of image pixels (pixel intensities) as its input layer, such an arrangement of weights for nodes 630 on a convolutional layer 614 that receives input from the input layer 612 may indicate that nodes 630 of that convolutional layer 614 of the CNN 214A may be trying to identify vertical lines in localized regions 625 of the input layer 625, or at least when 3 high intensity nodes 630 may be arranged in a vertical line. In this way, the nodes 630 of the convolutional layer 614 may be understood as detecting features in localized regions 625 of a previous layer.

Thus for CNNs, such as CNN 214A, each node 630 in the convolutional layer 614 responds to the same feature, but in a different localized region 625 of the input layer 612. For example, each node 630 in the convolutional layer 614 may assign a set of weights to be applied to outputted values from nodes within the localized region 625 that the node 630 is connected to. Each node 630 in the convolutional layer 614 will multiply the outputted value the node has received from the nodes 630 of a localized region 625 in the previous layer with a weight having a value of between zero and one. The node may then output a value to the next layer that is the sum of all the products. The output is then received as an input by nodes in the next layer.

The pooling layer 616 performs a pooling operation on the outputted values from the previous layer. In one embodiment, the convolutional layer 614 is divided into 2×2 sections 635, each section 635 corresponding to a node 630 in the pooling layer 616. In one embodiment, the highest value of the outputted values from the nodes 630 in a 2×2 section 635 in the previous layer is outputted by the nodes 630 of the pooling layer 616. In other embodiments, alternative operations may be used, such as finding an average of the outputted values from the nodes within a 2×2 section 635 in the previous layer. This pooling operation condenses a layer of nodes 630 into a layer with fewer nodes 630, thereby reducing the complexity of the CNN 214A, leading to faster processing speeds.

The fully connected layer 618 operates similarly to the hidden layers 302 from FIG. 3C in that each node in the fully connected layer 618 is connected to every node 630 in the previous layer and receives an outputted value from every node 630 in the previous layer. These layers allow the CNN 214A to perform additional processing based on the features that were identified and pooled in the convolutional layer 614 and the pooling layer 616. The fully connected layer 618 generates an output to the output layer 620 for classification of the input image, where each of the output nodes represent a class based on probabilities.

FIGS. 7A-7C are example flow diagrams of object detection in accordance with embodiments of the disclosure. In embodiments, the flow diagrams may be computer-implemented methods performed, at least partly, by hardware and/or software components illustrated in the various figures and as described herein. In one embodiment, software components executed by one or more processors, such as processor(s) 105 (FIG. 1) or processor 861 (FIG. 8), perform at least a portion of the methods.

Training the deep neural network begins at step 702, where training datasets include a set of two-dimensional (2D) images of the object from multiple views are received. The set of 2D images may be captured in different settings (e.g., different angles, different light settings, different environments, etc.) for each of the training datasets. A set of 3D models from the set of 2D images in each of the training datasets are reconstructed based on salient points of the object selected during reconstruction at 704. From the reconstructed 3D models, salient 3D models of the object may be generated that are an aggregation of the salient points of the object in the set of 3D models. At 706, a set of training 2D-3D correspondence data are generated between the set of 2D images of the object in a first training dataset and the salient 3D model of the object generated using the first training dataset. Using the set of training 2D-3D correspondence data generated using the first training dataset, a deep neural network is trained at 708 for object detection and segmentation.

In one embodiment, training the neural network includes receiving the set of training 2D-3D correspondence data at step 708A, processing the set of training 2D-3D correspondence data using the deep neural network to generate 2D points of the 2D-3D correspondence data at 708B, computing a loss between the 2D points and ground-truth 2D points using a loss function at 708C, calculating gradients based on the computed loss at 708D and updating network parameters based on the computed loss and calculated gradients at 708E.

At 711, as part of the salient attention learning, a set of matching 3D points is computed for each set of matching 3D models in the set of 3D models, and a six degree of freedom (6 DoF) rotation and translation is calculated at 712 to transform the set of matching 3D models. The 6 DoF rotations and translation are refined to align each of the 3D models into a unified 3D world coordinate system and to generate a unified 3D model by aligning each of the 3D models in the set of 3D models at 714 such that a set of 3D salient parts of the object may be determined using the deep neural network to generate the salient 3D model of the object at 716.

Once the deep neural network has been trained, it may be tested. At 718, new 2D images are received at an object detection network and the object detection network generates an object bounding box as input into the trained deep neural network. At 720, the object identified in the object bounding box may be detected using the trained deep neural network (without performing 3D reconstruction) of the new 2D images, and localization information and surface coordinates of the object detected by the trained deep neural network are output at 722.

Figure 8:
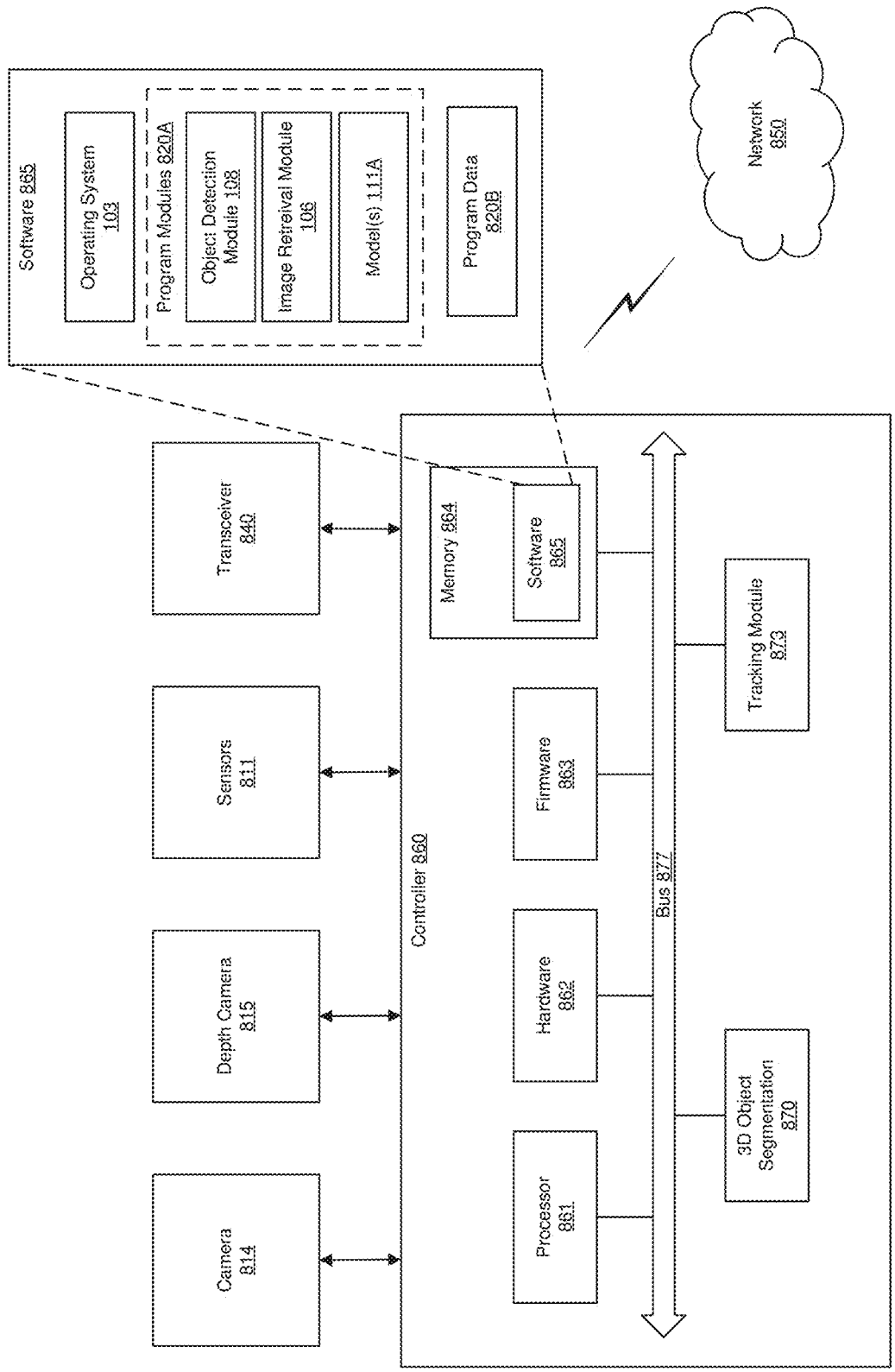
FIG. 8 illustrates an example block diagram of a device to perform 3D Object Segmentation (3DOS).

FIG. 8 illustrates an example block diagram of a device to perform 3D Object Segmentation (3DOS). The system may be a computing device, which may include one or more processors 861, 3DOS 870, and a memory 864. The device may also include a number of device sensors 811 coupled to one or more buses 877 or signal lines further coupled to at least the 3DOS 870. 3DOS 870 is illustrated separately from processor 861 and/or hardware 862 in the disclosed embodiment, but may be combined and/or implemented in the processor 861 and/or hardware 862 based on instructions in the software 865, and the firmware 863. Controller 860 can be configured to implement methods of performing Object segmentation, as described below.

In one embodiment, the computing device may be a mobile device, wireless device, cell phone, augmented reality (AR) device, personal digital assistant (FDA), wearable (e.g., eyeglasses, watch, head wear, or similar coupled to a body) device, mobile computer, tablet, personal computer, laptop computer, data processing device/system, or any type of device that has processing capabilities. In one embodiment, the computing device further includes a mechanism for capturing an image, such as color camera 814, depth camera 815, and may optionally include transceiver 840, sensors 811, such as accelerometers, gyroscopes, electronic compass, or other similar motion sensing elements. The computing device may also capture images on a front or rear-facing camera (e.g., camera 814), or a computer vision system, such as computer system 100 described above.

In general, color camera 814 may be a color or grayscale camera, which provide "color information," while "depth information" may be provided by a depth camera (e.g., depth camera 815). The term "color information" as used herein refers to color and/or grayscale information. In general, as used herein, a color image or color information may be viewed as comprising 1 to N channels, where Nis some integer dependent on the color space being used to store the image. For example, a Red, Blue, and Green (RGB) image comprises three channels, with one channel each for Red, Blue and Green information.

Depth information may be captured in a variety of ways using depth cameras (e.g., depth camera 815). The term "depth camera" is used to refer to functional units that may be used to obtain depth information independently from color camera 814. For example, depth camera 815 may be physically installed in a same general location as camera 814, however depth camera 815 may operate at a different frequency or frame rate from camera 814. In some embodiments, the depth camera 815 and camera sensor 814 may capture different scenes although triggered or initialized at the same or approximately equal time.

In another example, depth camera 815 may take the form of a light source coupled to the computing device. In one embodiment, the light source may project a structured or textured light pattern, which may consist of one or more narrow bands of light, onto objects in a scene. Depth information may then be obtained by exploiting geometrical distortions of the projected pattern caused by the surface shape of the object. In one embodiment, depth information may be obtained from stereo sensors such as a combination of an infra-red structured light projector and an infra-red camera registered to a RGB camera. In yet another embodiment, the stereo sensors may refer to a pair (or multiple) of optical (e.g., RGB or grayscale cameras) calibrated and equipped with an algorithm for calculating depth from pairs (multiples) of RGB/grayscale images.

In some embodiments, computing device may comprise multiple cameras, such as dual front cameras and/or a front and rear-facing cameras, which may also incorporate various sensors. In some embodiments, cameras may be capable of capturing both still and video images. In some embodiments, cameras may be RGB with depth (RGBD) or stereoscopic video cameras capable of capturing images at 30 frames per second (fps). In one embodiment, images captured by cameras may be in a raw uncompressed format and may be compressed prior to being processed and/or stored in memory 864. In some embodiments, image compression may be performed by processor 861 using lossless or lossy compression techniques.

Memory 864 may also include or store software 864, which comprises operating system 10, program modules 820A and program data 820B. The program modules 820A may include, object detection module 108, image retrieval module 106 and models 111A, described above with reference to FIG. 1.

In some embodiments, processor 861 may also receive input from sensors 811. Sensors 811 may comprise 3-axis accelerometer(s), 3-axis gyroscope(s), and/or magnetometer(s). Sensors 811 may provide velocity, orientation, and/or other position related information to processor 861. In some embodiments, sensors 811 may output measured information associated with the capture of each image frame by camera 814 and depth camera 815. In some embodiments, the output of sensors 811 may be used in part by processor 161 to determine a pose of cameras 814 and depth camera 815 and/or computing device.

The pose of camera 815 (also described above as camera "viewpoint") refers to the position and orientation of the depth camera 815 relative to a frame of reference. In some embodiments, camera pose may be determined for 6 DOF, which refers to three translation components (which may be given by X,Y,Z coordinates of a frame of reference) and three angular components (e.g., roll, pitch and yaw relative to the same frame of reference), described above.

In some embodiments, the pose of camera 814 and/or computing device may be determined and/or tracked by tracking module 873 and processor 861 using a visual tracking solution based on images captured by camera 814. In one embodiment, 3DOS implements one or more of a number of different tracking solutions. For example, the camera sensor aide for pose tracking may be received from RGB camera 814, or from depth camera 815. In some embodiments, when the depth camera 815 is an active sensor, a projected pattern is used to estimate depth, this sensor (815) is used itself to track the pose of the computing device. R however 815 is a passive sensor and consists of two RGB/grayscale cameras paired in the stereo pair, then 814 typically does not exist by itself, and may be one of these two cameras. In those situations, RGB from one of the 2 cameras and/or depth information derived from the stereo pair may be used for camera tracking purposes.

In some embodiments, the methods implemented by tracking module 873 may be based on color or grayscale image data captured by camera 814 and may be used to generate estimates of 600 F pose measurements of the camera. In some embodiments, the output of sensors 811 may be used to estimate, correct, and/or otherwise adjust the estimated pose. Further, in some embodiments, images captured by camera 814 and 815 may be used to recalibrate or perform bias adjustments for sensors 811.

In some embodiments, the 3D Object Segmentation 870 segments out objects within a scene or environment so that further processing may be performed on particular selected objects, such as object 114. For example, from output of 3DOS through a user interface or other means (not shown), a user or process can select which object is most relevant to the task at hand and focus on that particular object while ignoring or lowering priority of the other objects in the scene or environment. For example, the rest of the objects within a scene or environment may be used for tracking but not necessarily a focus of reconstruction for a 3D map or model.

In some embodiments, a 3DOS bounding shape provides dimensions of each bounded object. With the object's dimensions, 3DOS (or a separate application or module) can than interface or query a database to filter objects that match or don't match expected dimensions of a target object. For example, in an office setting, a chair may have expected dimensions, such that desks or other office objects can be properly excluded as being larger, smaller, or otherwise not matching the structure of a chair.

The computing device also includes one or more transceiver 840 or network interfaces, which may comprise wired links, such as an Ethernet cable or the like, and/or wireless links to access nodes or one or more networks 850. The transceiver allows the computing device to communicate with remote units via the networks 850. For example, the transceiver 840 may provide wireless communication via one or more transmitters/transmit antennas and one or more receivers/receive antennas. In one embodiment, the computing device is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

In one advantageous embodiment, there is a scalable and effective solution for personalized and subcategory food detection and recognition in home service systems. The home service system can distinguish personalized and subcategory food. Compared with traditional solutions of training naive end-to-end deep personalized and subcategory food detection networks that treat each type of personalized and subcategory food as a single class, the disclosed home service system has at least three major benefits: better scalability where a relatively smaller-capacity network can be used for food detection and recognition, while the naive end-to-end solution requires much higher-capacity networks to distinguish the many types of personalized and subcategory food; reduced computation when a new type of personalized or subcategory food is introduced to the system, where the network fine-tunes or re-trains the corresponding sub-network of the associated food category, while the naive end-to-end solution requires to fine-tune or re-train the entire network; and reduced overfitting where the smaller-capacity network can be well trained using the small amount of noisy training data.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for object detection, comprising:
   receiving one or more training data sets including a set of two-dimensional (2D) images of the object from multiple views, wherein the set of 2D images are captured in different settings for each of the one or more training datasets;
   reconstructing a set of 3D models from the set of 2D images in each of the one or more training datasets based on salient points of the object selected during reconstruction to generate one or more salient 3D models of the object that is an aggregation of the salient 3D points of the object in the set of 3D models, the salient 3D points comprising selected 3D points of salient parts of the object, the salient parts computed from selected 3D points based on similarity between the 3D points;
   generating a set of training 2D-3D correspondence data between the set of 2D images of the object in a first training dataset of the one or more training datasets and the salient 3D model the object generated using the first training dataset; and
   training a deep neural network using the set of training 2D-3D correspondence data generated using the first training data set for object detection and segmentation.

2. The computer implemented method of claim 1, further comprising:
   computing a set of matching 3D points for each set of matching 3D models in the set of 3D models;
   calculating a six degree of freedom (6 DoF) rotation and translation to transform the set of matching 3D models;
   refining the 6 DoF rotations and translation to align each of the 3D models into a unified 3D world coordinate system and to generate a unified 3D model by aligning each of the 3D models in the set of 3D models; and
   determining a set of 3D salient parts of the object using the deep neural network to generate the salient 3D model of the object.

3. The computer implemented method of claim 1,
   wherein the 3D model is a 3D point cloud of the object and each point in the 3D point cloud records a 3D coordinate of the point in a 3D space; and
   the computer implemented method further comprising computing a feature representation from each point in the 3D point cloud as a feature vector computed based on a visual appearance of corresponding pixels in corresponding 2D images.

4. The computer implemented method of claim 1, further comprising pruning the set of training 2D-3D correspondence data to reduce noise in the set of 2D images.

5. The computer implemented method of claim 1, wherein training the deep neural network comprises:
   receiving the set of training 2D-3D correspondence data;
   processing the set of training 2D-3D correspondence data using the deep neural network to generate 2D points of the 2D-3D correspondence data;
   computing a loss between the 2D points and ground-truth 2D points using the loss function;
   calculating gradients based on the computed loss; and
   updating network parameters based on the computed loss and calculated gradients.

6. The computer implemented method of claim 1, further comprising receiving one or more new 2D images at an object detection network, the object detection network generating an object bounding box as input into the trained deep neural network.

7. The computer implemented method of claim 6, further comprising:
   detecting the object identified in the object bounding box using the trained deep neural network without performing 3D reconstruction of the one or more new 2D images; and
   outputting localization information and surface coordinates of the object detected by the trained deep neural network.

8. The computer implemented method of claim 7, wherein the trained deep neural network processes the object bounding box by
   convolving the one or more new 2D images to extract features, the extracted features forming a feature map;

creating regions of interest (RoIs) by applying a region proposal method to the feature map;

feeding the RoIs and the feature map of the one or more 2D images to refine the RoIs by aligning boundaries of the feature map and target feature map; and outputting the localization information and classification results of the object based on the refined RoIs, where that the localization information defines a location of the object in the image and the classification results estimate the surface coordinates of the object.

9. The computer implemented method of claim 7, further comprising generating the set of training 2D-3D correspondence data between the set of 2D images of the object in a second training dataset of the one or more training datasets and the salient 3D model of the object generated using the second training dataset; and training the deep neural network using the set of training 2D-3D correspondence data generated using the second training dataset for object detection and segmentation.

10. A device for object detection, comprising:

a non-transitory memory storage comprising instructions; and one or more processors in communication with the memory, wherein the one or more processors execute the instructions to:

receive one or more training datasets including a set of two-dimensional (2D) images of the object from multiple views, wherein the set of 2D images are captured in different settings for each of the one or more training datasets;

reconstruct a set of 3D models from the set of 2D images in each of the one or more training datasets based on salient points of the object selected during reconstruction to generate one or more salient 3D models of the object that is an aggregation of the salient 3D points of the object in the set of 3D models, the salient 3D points comprising selected 3D points of salient parts of the object, the salient parts computed from the selected 3D points based on similarity between the 3D points;

generate a set of training 2D-3D correspondence data between the set of 2D images of the object in a first training dataset of the one or more training datasets and the salient 3D model of the object generated using the first training dataset; and train a deep neural network using the set of training 2D-3D correspondence data generated using the first training dataset for object detection and segmentation.

11. The device of claim 10, wherein the one or more processors further execute the instructions to:

compute a set of matching 3D points for each set of matching 3D models in the set of 3D models;

calculate a six degree of freedom (6 DoF) rotation and translation to transform the set of matching 3D models;

refine the 6 DoF rotations and translation to align each of the 3D models into a unified 3D world coordinate system and to generate a unified 3D model by aligning each of the 3D models in the set of 3D models; and determine a set of 3D salient parts of the object using the deep neural network to generate the salient 3D model of the object.

12. The device of claim 10, wherein the 3D model is a 3D point cloud of the object and each point in the 3D point cloud records a 3D coordinate of the point in a 3D space, and wherein the one or more processors execute the instructions to compute a feature representation from each point in the 3D point cloud as a feature vector computed based on a visual appearance of corresponding pixels in corresponding 2D images.

13. The device of claim 10, further comprising pruning the set of training 2D-3D correspondence data to reduce noise in the set of 2D images.

14. The device of claim 10, wherein training the deep neural network comprises:

receiving the set of training 2D-3D correspondence data;

processing the set of training 2D-3D correspondence data using the deep neural network to generate 2D points of the 2D-3D correspondence data;

computing a loss between the 2D points and ground-truth 2D points using the loss function;

calculating gradients based on the computed loss; and updating network parameters based on the computed loss and calculated gradients.

15. The device of claim 10, wherein the one or more processors execute the instructions to receive one or more new 2D images at an object detection network, the object detection network generating an object bounding box as input into the trained deep neural network.

16. The device of claim 15, wherein the one or more processors execute the instructions to:

detect the object identified in the object bounding box using the trained deep neural network without performing 3D reconstruction of the one or more new 2D images; and output localization information and surface coordinates of the object detected by the trained deep neural network.

17. The device of claim 16, wherein the trained deep neural network processes the object bounding box by convolving the one or more new 2D images to extract features, the extracted features forming a feature map;

creating regions of interest (RoIs) by applying a region proposal method to the feature map;

feeding the RoIs and the feature map of the one or more 2D images to refine the RoIs by aligning boundaries of the feature map and target feature map; and outputting the localization information and classification results of the object based on the refined RoIs, where that the localization information defines a location of the object in the image and the classification results estimate the surface coordinates of the object.

18. The device of claim 17, wherein the one or more processors execute the instructions to:

generate the set of training 2D-3D correspondence data between the set of 2D images of the object in a second training dataset of the one or more training datasets and the salient 3D model of the object generated using the second training dataset; and train the deep neural network using the set of training 2D-3D correspondence data generated using the second training dataset for object detection and segmentation.

19. A non-transitory computer-readable medium storing computer instructions for object detection, that when executed by one or more processors, cause the one or more processors to perform the steps of:

receiving one or more training datasets including a set of two-dimensional (2D) images of the object from multiple views, wherein the set of 2D images are captured in different settings for each of the one or more training datasets;

reconstructing a set of 3D models from the set of 2D images in each of the one or more training datasets based on salient points of the object selected during reconstruction to generate one or more salient 3D models of the object that is an aggregation of the salient 3D points of the object in the set of 3D models, the salient 3D points comprising selected 3D points of salient parts of the object, the salient parts computed from the selected 3D points based on similarity between the 3D points;

generating a set of training 2D-3D correspondence data between the set of 2D images of the object in a first training dataset of the one or more training datasets and the salient 3D model of the object generated using the first training dataset; and training a deep neural network using the set of training 2D-3D correspondence data generated using the first training dataset for object detection and segmentation.

20. The non-transitory computer-readable medium of claim 19, further causing the one or more processors to perform the steps of:

computing a set of matching 3D points for each set of matching 3D models in the set of 3D models;

calculating a six degree of freedom (6 DoF) rotation and translation to transform the set of matching 3D models;

refining the 6 DoF rotations and translation to align each of the 3D models into a unified 3D world coordinate system and to generate a unified 3D model by aligning each of the 3D models in the set of 3D models; and determining a set of 3D salient parts of the object using the deep neural network to generate the salient 3D model of the object.

21. The non-transitory computer-readable medium of claim 19, wherein the 3D model is a 3D point cloud of the object and each point in the 3D point cloud records a 3D coordinate of the point in a 3D space; and further causing the one or more processors to perform the step of computing a feature representation from each point in the 3D point cloud as a feature vector computed based on a visual appearance of corresponding pixels in corresponding 2D images.

22. The non-transitory computer-readable medium of claim 19, further causing the one or more processors to perform the step of pruning the set of training 2D-3D correspondence data to reduce noise in the set of 2D images.

23. The non-transitory computer-readable medium of claim 19, wherein training the deep neural network comprises:

receiving the set of training 2D-3D correspondence data;

processing the set of training 2D-3D correspondence data using the deep neural network to generate 2D points of the 2D-3D correspondence data;

computing a loss between the 2D points and ground-truth 2D points using the loss function;

calculating gradients based on the computed loss; and updating network parameters based on the computed loss and calculated gradients.

24. The non-transitory computer-readable medium of claim 19, further causing the one or more processors to perform the step of receiving one or more new 2D images at an object detection network, the object detection network generating an object bounding box as input into the trained deep neural network.

25. The non-transitory computer-readable medium of claim 24, further causing the one or more processors to perform the steps of:

detecting the object identified in the object bounding box using the trained deep neural network without performing 3D reconstruction of the one or more new 2D images; and outputting localization information and surface coordinates of the object detected by the trained deep neural network.

26. The non-transitory computer-readable medium of claim 25, wherein the trained deep neural network processes the object bounding box by convolving the one or more new 2D images to extract features, the extracted features forming a feature map;

creating regions of interest (RoIs) by applying a region proposal method to the feature map;

feeding the RoIs and the feature map of the one or more 2D images to refine the RoIs by aligning boundaries of the feature map and target feature map; and outputting the localization information and classification results of the object based on the refined RoIs, where that the localization information defines a location of the object in the image and the classification results estimate the surface coordinates of the object.

27. The non-transitory computer-readable medium of claim 25, further causing the one or more processors to perform the steps of:

generating the set of training 2D-3D correspondence data between the set of 2D images of the object in a second training dataset of the one or more training datasets and the salient 3D model of the object generated using the second training dataset; and training the deep neural network using the set of training 2D-3D correspondence data generated using the second training dataset for object detection and segmentation.

* * * * *